United States Patent
Rink et al.

[19]

[11] Patent Number: 6,143,172
[45] Date of Patent: Nov. 7, 2000

[54] METHODS FOR AMELIORATING HYDROCARBON SPILLS IN MARINE AND INLAND WATERS

[75] Inventors: Glenn R. Rink, Scottsdale, Ariz.; Robert L. Rosania, Bensalem, Pa.; David R. Smith, Tucson; Thomas C. Johnson, Scottsdale, both of Ariz.

[73] Assignee: Abtech Industries, Inc., Scottsdale, Ariz.

[21] Appl. No.: 09/236,681

[22] Filed: Jan. 25, 1999

Related U.S. Application Data

[62] Division of application No. 08/653,228, May 24, 1996, Pat. No. 5,863,440.

[51] Int. Cl.[7] .............................. B01D 15/00; E02B 15/10
[52] U.S. Cl. .......................... 210/237; 210/241; 210/496; 210/502.1; 210/503; 210/505; 210/510.1; 210/692; 210/693; 210/923; 210/924; 210/925; 428/36.9; 428/407
[58] Field of Search .................................... 210/776, 922, 210/923, 924, 925, 690, 691, 692, 693, 503, 502.1, 505, 237, 241, 496, 510.1; 428/403, 407, 34.1, 35.7, 36.9

[56] References Cited

U.S. PATENT DOCUMENTS

| | | |
|---|---|---|
| Re. 29,996 | 5/1979 | Jordan et al. .......................... 210/281 |
| 248,559 | 10/1881 | Jackson . |
| 425,641 | 4/1890 | Van De Walle . |

(List continued on next page.)

FOREIGN PATENT DOCUMENTS

| | | |
|---|---|---|
| 0484061 A1 | 5/1992 | European Pat. Off. . |
| 0518336 A1 | 12/1992 | European Pat. Off. . |
| 136162 | 6/1979 | Germany . |
| 2904428 | 8/1980 | Germany . |
| 3122219 A1 | 6/1981 | Germany . |
| 3634289 | 4/1988 | Germany . |
| 4-371203 | 12/1992 | Japan . |
| 7109 | of 1905 | United Kingdom . |
| 13514 | 7/1983 | United Kingdom . |

OTHER PUBLICATIONS

"Block Copolymers," *Polymer Handbook*, p. 34 (Wiley, 3rd Edition 1989).

"Selection Criteria and Laboratory Evaluation of Oilspill Sorbents," *Environmental Protection Series*, Report EPS 3/SP/3, pp. 1–73 (Jun. 1991).

"Environmental Spill Encapsulant Polymers," *IRM Chemical Form 550 product brochure* (Aug. 1993).

Rushefsky, "Old Tires Now Can Now Be Recycled," *Staten Island Advance* (Oct. 22, 1993).

(List continued on next page.)

*Primary Examiner*—Robert J. Popovics
*Attorney, Agent, or Firm*—Louis J. Hoffman

[57] ABSTRACT

A plurality of water- and oil-porous sacks are partially filled with a number of generally toroidal bodies of a polymer material that entraps oil and including mesh fragments scattered throughout the bodies. Each sack is sewn with a perimeter stiffening ring, to retain a flat profile, and has a netting that closes to help inhibit outflow of the oil when the sack is retrieved. When deployed from ship or by air onto a spill, the sacks spread into a pancake shape and the polymer matter forms a single layer that retains the oil. The inventive sacks will float indefinitely without releasing the oil or allowing it to emulsify, so the oil can remain in place until collection efforts are feasible. The sacks can be burned in situ, or standard fishing boats or specialized collection boats can be used to retrieve the sacks, and the collected material can be burned to capture the energy content of the oil or processed to separate the oil from the polymer. The inventive sacks can be used in conjunction with other, known containment or retrieval equipment, such as booms or skimmers. The system is specifically designed for rapid deployment and efficiency in rough water.

51 Claims, 13 Drawing Sheets

U.S. PATENT DOCUMENTS

| | | |
|---|---|---|
| 543,740 | 7/1895 | Kuhns . |
| 1,032,700 | 7/1912 | Pickett . |
| 1,164,527 | 12/1915 | Kelly, Jr. . |
| 1,274,227 | 7/1918 | Woodson . |
| 1,471,819 | 10/1923 | Bauschard . |
| 1,935,642 | 11/1933 | Laughlin ................... 210/45 |
| 2,467,021 | 4/1949 | Fischer ..................... 210/44 |
| 2,557,079 | 6/1951 | Cutri ......................... 294/77 |
| 2,813,745 | 11/1957 | Frieder et al. ............ 294/77 |
| 2,889,928 | 6/1959 | Sisk ........................... 210/163 |
| 3,147,216 | 9/1964 | Oemler ..................... 210/693 |
| 3,221,888 | 12/1965 | Muller ....................... 210/333 |
| 3,246,582 | 4/1966 | Wade ......................... 94/33 |
| 3,324,630 | 6/1967 | Teller et al. ................ 55/90 |
| 3,415,745 | 12/1968 | Isaacson .................... 210/54 |
| 3,494,862 | 2/1970 | Horowitz .................. 210/693 |
| 3,518,183 | 6/1970 | Evans ........................ 210/40 |
| 3,536,616 | 10/1970 | Kondoh et al. ........... 210/693 |
| 3,537,587 | 11/1970 | Kain ........................... 210/242 |
| 3,538,020 | 11/1970 | Heskett et al. ............ 210/496 |
| 3,539,013 | 11/1970 | Smith ......................... 210/242 |
| 3,565,257 | 2/1971 | Cavalieri .................... 210/242 |
| 3,567,660 | 3/1971 | Winkler ..................... 260/2.3 |
| 3,594,335 | 7/1971 | Schultz et al. ............. 260/2.5 |
| 3,607,741 | 9/1971 | Sohnius ...................... 210/242.4 |
| 3,607,793 | 9/1971 | Mahlman .................... 260/93.7 |
| 3,617,565 | 11/1971 | Fahlvik ....................... 210/691 |
| 3,617,566 | 11/1971 | Oshima et al. ............. 210/242.4 |
| 3,667,235 | 6/1972 | Preus et al. ................. 61/1 |
| 3,667,608 | 6/1972 | Burroughs et al. ......... 210/242 |
| 3,679,058 | 7/1972 | Smith ........................... 210/242 |
| 3,681,237 | 8/1972 | Orban .......................... 210/680 |
| 3,702,657 | 11/1972 | Cunningham et al. ...... 210/242 |
| 3,739,913 | 6/1973 | Bogosian ..................... 210/924 |
| 3,756,948 | 9/1973 | Weinberg .................... 210/693 |
| 3,783,621 | 1/1974 | Preus et al. .................. 61/1 F |
| 3,800,950 | 4/1974 | Hess et al. ................... 210/242.4 |
| 3,831,760 | 8/1974 | Economy et al. ........... 210/242 |
| 3,837,494 | 9/1974 | Stevenson ................... 210/259 |
| 3,868,322 | 2/1975 | Orloff ........................... 210/108 |
| 3,888,766 | 6/1975 | DeYoung ..................... 210/693 |
| 3,915,859 | 10/1975 | Sundin et al. ................ 210/104 |
| 3,916,969 | 11/1975 | Auerbach et al. ........... 152/354 |
| 3,923,472 | 12/1975 | Martinez et al. ............ 44/50 |
| 3,929,631 | 12/1975 | Winkler ....................... 210/36 |
| 4,002,177 | 1/1977 | Rainer et al. ................ 131/10 R |
| 4,031,839 | 6/1977 | Pedone ......................... 114/270 |
| 4,039,489 | 8/1977 | Fletcher et al. .............. 210/924 |
| 4,052,306 | 10/1977 | Schwartz et al. ............ 210/242 S |
| 4,060,487 | 11/1977 | Samsel ......................... 210/923 |
| 4,061,807 | 12/1977 | Shaler et al. ................. 210/502 |
| 4,065,923 | 1/1978 | Preus ............................ 61/1 F |
| 4,070,287 | 1/1978 | Wiegand et al. ............. 210/693 |
| 4,084,380 | 4/1978 | Hallhagen .................... 61/1 F |
| 4,099,619 | 7/1978 | Hudler et al. ................ 206/524.1 |
| 4,102,783 | 7/1978 | Zenno et al. ................. 210/710 |
| 4,111,813 | 9/1978 | Preus ............................ 210/282 |
| 4,206,080 | 6/1980 | Sato et al. .................... 252/430 |
| 4,207,378 | 6/1980 | Klein ............................ 428/402 |
| 4,248,758 | 2/1981 | Wright .......................... 260/33.6 |
| 4,261,823 | 4/1981 | Gallagher et al. ............ 210/164 |
| 4,264,444 | 4/1981 | Bronnec ........................ 210/924 |
| 4,332,854 | 6/1982 | Parker .......................... 210/924 |
| 4,366,067 | 12/1982 | Golding et al. .............. 210/671 |
| 4,401,475 | 8/1983 | Eriksson et al. ............. 210/924 |
| 4,419,232 | 12/1983 | Arntyr et al. ................. 210/164 |
| 4,420,400 | 12/1983 | Weitzen ....................... 210/710 |
| 4,427,157 | 1/1984 | Klein ............................ 210/160 |
| 4,429,065 | 1/1984 | Gancy .......................... 523/223 |
| 4,439,324 | 3/1984 | Crotti ........................... 210/924 |
| 4,454,039 | 6/1984 | McCoy ........................ 210/164 |
| 4,497,663 | 2/1985 | Fisher et al. ................. 134/4 |
| 4,497,712 | 2/1985 | Crowling ..................... 210/242.4 |
| 4,519,431 | 5/1985 | Yoshimura et al. ......... 152/209 R |
| 4,519,918 | 5/1985 | Ericsson et al. ............. 210/680 |
| 4,560,718 | 12/1985 | Ritchey ........................ 524/13 |
| 4,592,690 | 6/1986 | Busch ........................... 413/19 |
| 4,594,157 | 6/1986 | McGowan ................... 210/163 |
| 4,640,730 | 2/1987 | Streets et al. ................ 156/334 |
| 4,672,781 | 6/1987 | Pichon ......................... 52/94 |
| 4,737,394 | 4/1988 | Zafiroglu ..................... 210/694 |
| 4,740,435 | 4/1988 | Markin et al. ............... 429/174 |
| 4,801,386 | 1/1989 | Sugimori et al. ............ 210/680 |
| 4,919,820 | 4/1990 | Lafay et al. .................. 210/671 |
| 4,929,349 | 5/1990 | Beckman ..................... 210/151 |
| 4,941,978 | 7/1990 | Gabrick ........................ 210/693 |
| 4,965,129 | 10/1990 | Bair et al. ..................... 210/924 |
| 4,980,229 | 12/1990 | Park et al. .................... 428/327 |
| 5,009,790 | 4/1991 | Bustamante et al. ......... 210/242.4 |
| 5,032,640 | 7/1991 | Fachini ......................... 524/426 |
| 5,037,541 | 8/1991 | Ruey-Jang et al. ........... 210/141 |
| 5,071,564 | 12/1991 | Stein et al. .................... 210/924 |
| 5,075,014 | 12/1991 | Sullivan ........................ 210/776 |
| 5,104,548 | 4/1992 | Gabrick ........................ 210/680 |
| 5,133,619 | 7/1992 | Murfae et al. ................ 404/4 |
| 5,135,578 | 8/1992 | Billings ........................ 210/924 |
| 5,135,660 | 8/1992 | Chromecek et al. ......... 210/671 |
| 5,159,016 | 10/1992 | Inoue et al. ................... 525/92 |
| 5,165,821 | 11/1992 | Fischer et al. ................ 405/63 |
| 5,173,182 | 12/1992 | Debellian ..................... 210/170 |
| 5,179,611 | 1/1993 | Umeda et al. ................ 385/110 |
| 5,181,802 | 1/1993 | Thengs et al. ................ 405/70 |
| 5,186,831 | 2/1993 | DePetris ....................... 210/924 |
| 5,207,901 | 5/1993 | Ravagnan ..................... 210/173 |
| 5,211,858 | 5/1993 | Dovan et al. ................. 252/8.551 |
| 5,227,072 | 7/1993 | Brinkley ....................... 210/924 |
| 5,232,587 | 8/1993 | Hegemier et al. ............ 210/162 |
| 5,248,729 | 9/1993 | Inoue et al. ................... 525/92 |
| 5,252,215 | 10/1993 | McFarlane et al. .......... 210/69.1 |
| 5,256,226 | 10/1993 | Marzola et al. .............. 156/95 |
| 5,278,217 | 1/1994 | Umeda et al. ................ 524/394 |
| 5,281,463 | 1/1994 | Cotton .......................... 428/126 |
| 5,297,367 | 3/1994 | Sainz ............................ 52/12 |
| 5,304,311 | 4/1994 | Codiglia ....................... 210/693 |
| 5,324,429 | 6/1994 | Holland ........................ 210/484 |
| 5,330,651 | 7/1994 | Robertson .................... 210/617 |
| 5,360,548 | 11/1994 | Stein et al. .................... 210/693 |
| 5,364,535 | 11/1994 | Buckalew .................... 210/671 |
| 5,374,600 | 12/1994 | Hozumi et al. .............. 502/402 |
| 5,403,474 | 4/1995 | Emery .......................... 210/163 |
| 5,405,539 | 4/1995 | Schneider .................... 210/747 |
| 5,407,575 | 4/1995 | Vinsonhaler ................. 210/924 |
| 5,414,029 | 5/1995 | Lemoine et al. ............. 524/60 |
| 5,423,985 | 6/1995 | Addeo et al. ................. 210/924 |
| 5,428,085 | 6/1995 | Burel et al. ................... 524/59 |
| 5,432,000 | 7/1995 | Young, Sr. et al. .......... 428/372 |
| 5,439,590 | 8/1995 | Steffan ......................... 210/616 |
| 5,468,539 | 11/1995 | Crivelli ........................ 428/141 |
| 5,480,254 | 1/1996 | Autry et al. .................. 404/2 |
| 5,496,865 | 3/1996 | Heese et al. ................. 521/79 |
| 5,516,845 | 5/1996 | Heese et al. ................. 525/193 |
| 5,573,349 | 11/1996 | Paoluccio .................... 405/52 |
| 5,624,576 | 4/1997 | Lenhart et al. .............. 210/767 |
| 5,632,889 | 5/1997 | Tharp ........................... 210/165 |
| 5,641,847 | 6/1997 | Hozumi et al. .............. 526/328.5 |
| 5,707,527 | 1/1998 | Knutson et al. ............. 210/660 |
| 5,712,358 | 1/1998 | Sojka ........................... 526/323.2 |
| 5,720,574 | 2/1998 | Barella ......................... 405/52 |
| 5,725,782 | 3/1998 | Chinn et al. ................. 210/767 |
| 5,744,048 | 4/1998 | Stetler ......................... 210/803 |
| 5,762,790 | 6/1998 | Zoeller ........................ 210/238 |
| 5,767,060 | 6/1998 | Hanrahan .................... 210/502.1 |

| | | | |
|---|---|---|---|
| 5,788,849 | 8/1998 | Hutter, Jr. et al. | 210/163 |
| 5,820,762 | 10/1998 | Bamer et al. | 210/661 |
| 5,830,967 | 11/1998 | Sojka | 526/323.2 |
| 5,834,577 | 11/1998 | Sojka | 526/323.2 |
| 5,849,198 | 12/1998 | Sharpless | 210/693 |
| 5,863,440 | 1/1999 | Rink et al. | 210/693 |
| 5,869,555 | 2/1999 | Simmons et al. | 524/229 |
| 5,955,552 | 9/1999 | Sojka | 526/88 |
| 5,958,226 | 9/1999 | Fleischmann | 210/165 |

OTHER PUBLICATIONS

"Titan Tech Attacks Tire Recycling Mess," *American Metal Market* (Oct. 26, 1993).

Alexander, "Bradley is Center of World Attention this Week" *Chickasha Daily Express* (Nov. 4, 1993).

"Business & Technology," *Solid Waste Report*, vol. 24, No. 43, p. 346 (Nov. 4, 1993).

"A Cooler Way to Melt Junked Tires," *Business Week* (Nov. 8, 1993).

Schulman, "A New Spin on Old Tires," *Newsweek* (Nov. 15, 1993).

"Titan Develops Tyre & Plastics Recycling," *HazNews* (Dec. 1993).

Kokish, "Titan Opens Pyrolysis Plants in South Korea," *Tire Business* (Dec. 13, 1993).

Metz, "N.M. Firm is Ready to Roll into the Tire Recycling Industry," *The Boston Globe* (Dec. 28, 1993).

"High–Tech Breakthroughs," *Boardroom Reports* (Jan. 1, 1994).

Kansas, "Catalysts and Beams Take Aim at Wastes," *The Wall Street Journal* (Jan. 21, 1994).

"Recycling News," *Green Alternatives*, vol. 4, No. 1 (Feb./Mar. 1994).

"Titan Technologies, Inc.," *Conservative Speculator* (Jun. 1994).

"Titan Technologies, Inc.," *Investor's NewsWire*, p. All (Sep. 9, 1994).

DiChristina, "Mired in Tires," *Popular Science* (Oct. 1994).

McDonagh, et al., "Handling and Disposal of Oil Waste from Oil Spills at Sea," paper presented at Long Beach Oil Spill Conference (Feb. 27, 1995).

Cassidy, "Titan Potential," *MoneyWorld* (Apr. 1995), pp. 18–21.

Titan Technologies, Inc. Investor's Booklet.

"Petrosorb HGPPL–1 Petroleum Product Spill Encapsulant," *Petrosorb product brochure* (source and date unknown).

"First in Thirst," *Matasorb Industrial Sorbents product brochure* (source and date unknown).

Pacific Fluid System, Corp. "Linductor Oil Recovery and Bulk Transfer System Booklet."

"Fact Sheets," *Team One Use Challenger Product Information*.

Fingas, Mervis F., et al. "The Newfoundland Offshore Burn Experiment–Nobe."

Buist, Ian A., et al. "In–Situ Burning of Alaska North Slope Emulsions,".

Guenette, Chantal, et al. "Studies of In–Situ Burning of Emulsions in Norway."

Fam, Sami, Michael K. Stenstron, and Gary Silverman, "Hydrocarbons in Urban Runoff," *Journal of Environmental Engineering*, vol. 113, No. 5, Oct. 1987, pp. 1032–1046.

Shepp, David L., "Petroleum Hydrocarbon Concentrations Observed in Runoff from Discrete, Urbanized Automotive–Intensive Land Uses," Watershed '96 Conference Proceedings, pp. 220–223.

Materials re: King County Evaluation of Commercially Available Catch Basin Inserts for Treatment of Stormwater Runoff from Developed Sites, Oct. 1995.

Imtech–Imbibitive Technologies Corporation product literature re "Imbiber Beads," 1993, 1996, 1997.

"HydroCartridges/Rubberizer" product literature, 1994–1997.

Aqua Treatment Systems, Inc./"Absorbent W" product literature, 1996–1997.

"Innovative Stormwater Treatment Products & Services Guide," prepared for the Stormwater Technologies Trade Shows, Nov. 17 & 19, 1997 (discussing several products, some of which were commercially available before Sep. 1997).

Suntree Isles, Inc. "Curb Inlet Basket" product literature, 1995–1996 (and see item A above).

Inventive Resources, Inc. "Water Decontaminator" product literature (Apr. 1998 and see item B above).

PCT Int'l Prelim. Exam. Report, S.N. PCT/US98/00385 (May 20, 1999).

Kristar Enterprises, Fossil Filter, brochure (Sep. 1996).

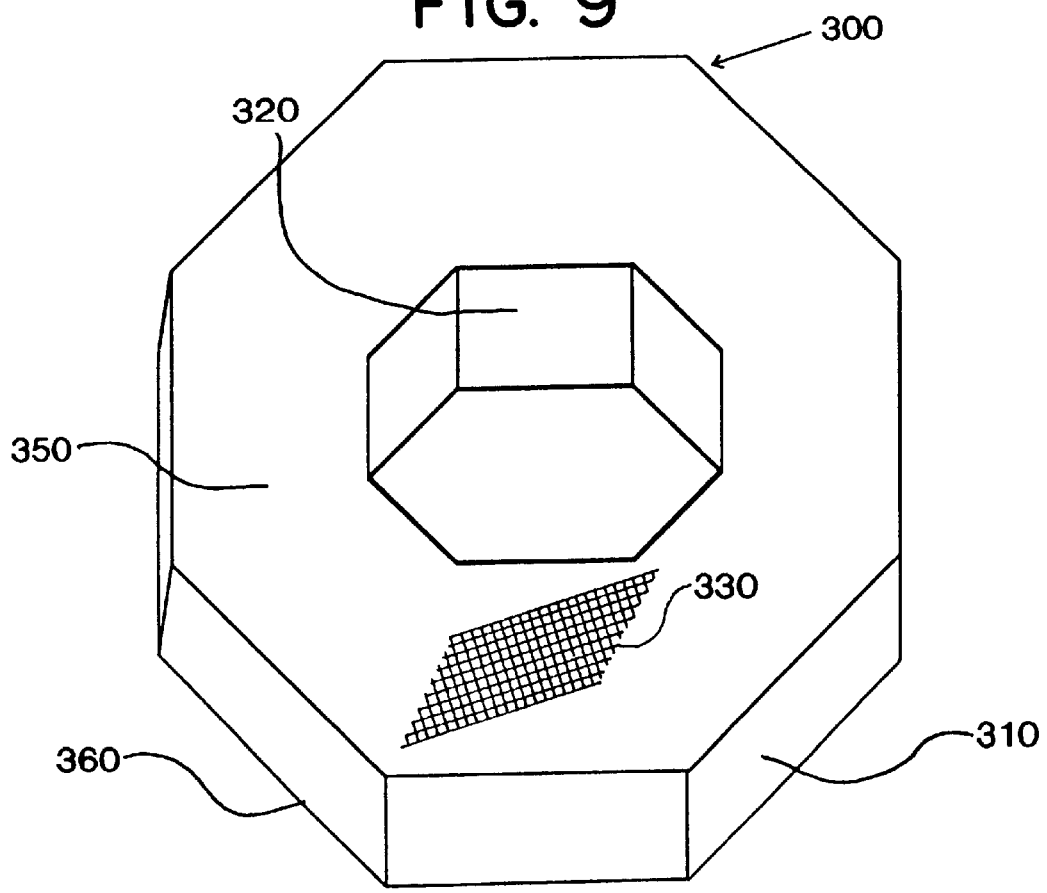
FIG. 9
FIG. 10
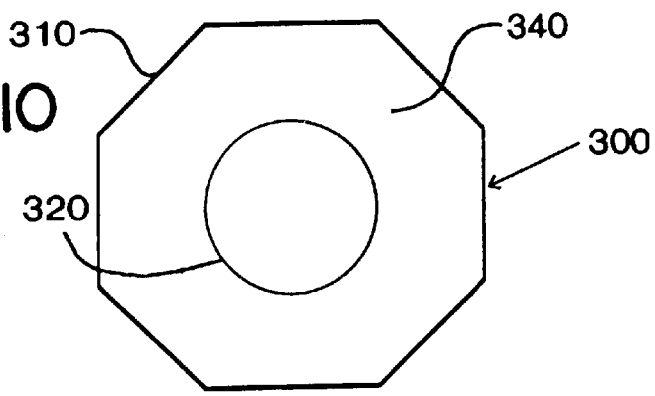
FIG. 11

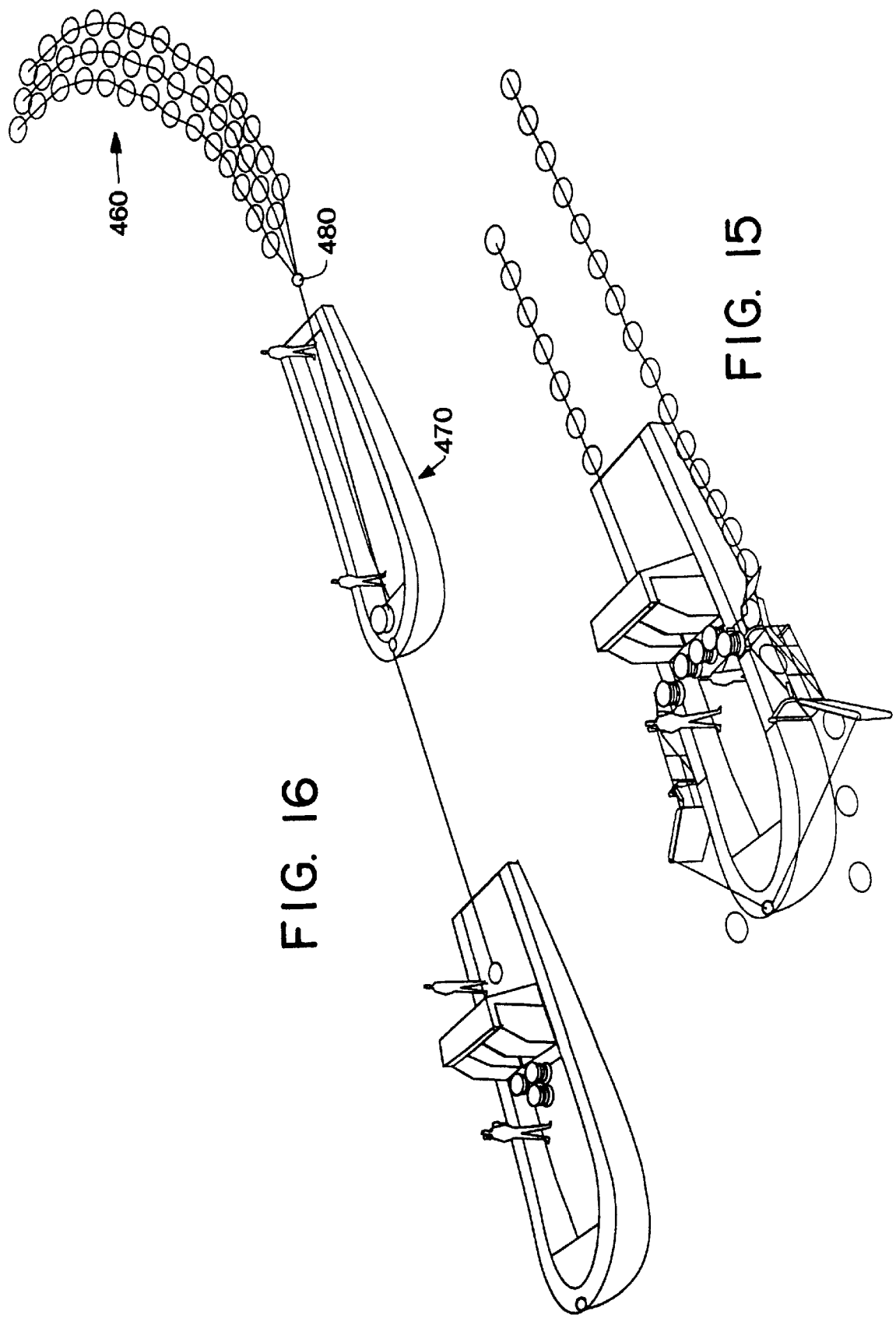

METHODS FOR AMELIORATING HYDROCARBON SPILLS IN MARINE AND INLAND WATERS

CROSS-REFERENCE TO RELATED APPLICATION

This is a division of application Ser. No. 08/653,228, filed May 24, 1996, now U.S. Pat. No. 5,863,440.

FIELD OF THE INVENTION

This invention is in the field of systems and methods for recovering oil spilled on an open-water surface, such as the ocean.

BACKGROUND OF THE INVENTION

The continuing incidence of oil spillage into both marine and inland waterways due to shipping accidents results in enormous annual costs both financially to the shipping and insurance industries and environmentally. Many spill incidents occur in bad weather or in remote locations. Current systems for ameliorating oil spills require that specialized spill-response ships containing unique heavy equipment reach the site of the spill quickly, which requires relatively calm waters. There is a limited number of units of specialized equipment, and they are not easily transported. Thus, in many cases, response to the spill is delayed for many hours or even days. The impact of a spill is greatly increased by both bad weather and delayed response. Spill damage can be mitigated if response is rapid, even in rough-water conditions.

An additional problem is the high cost of disposal of the recovered material. Current recovery systems create large quantities of waste, which must be disposed of as hazardous waste at high financial cost. This problem can be solved by employing a system that allows for recycling, reclaiming, or low cost disposal.

Known systems for the clean-up of oil spilled on water fall into two categories: (1) absorption or adsorption (sorbing) of the oil, or (2) skimming of the oil, typically in conjunction with containment.

Many materials are known to be oil-absorbent or oil-adsorbent, such as wood chips, activated carbon, wool, cotton balls, corn husks, duck feathers, and various synthetic polymeric materials. A number of polymeric materials (polypropylene, polyester, polyurethane, vinyl polymers, and others) are known to absorb or adsorb crude or refined oil. Systems for applying these materials to oil spills are less developed. Application of materials to oil have been largely limited to two types: (1) spraying particles of the oil-sorbing material on the spill, or (2) placing the material inside booms or other barriers that surround the spill.

Either method creates severe collection problems for sorbent material in particulate form, including sinking of the oil-loaded material, loss of the oil-loaded material due to dispersion by wave action or high winds, and dissolution of the oil-sorbent material in the oil spill. These problems are exacerbated when the spill occurs in bad weather or near shorelines. In addition, because 90% of spilled oil is typically located in 10% of the spill area, the dissolution problem can be particularly troublesome inside barriers. Further, the application of oil-sorbing material typically employs spill boats, which rely on availability of the boat and access to the spill. Both of these can be a severe problem in remote locations or bad weather.

Containers for oil-sorbing materials are known. These systems generally employ pillow or bale shaped containers. However, these containers have a tendency to pile up on top of each other, creating an undesirable condition in which a significant amount of the sorbent material is either below the waterline or floating above the oil, in either case out of contact with the oil. In addition, the large cross section of these types of containers tends to result in an "oil lock-out" phenomenon, in which the surface of the material becomes saturated with oil, effectively preventing oil migration to the center of the material. These containers also have a propensity for folding over on themselves in heavy seas, thereby entrapping water, which causes them to sink.

On the other hand, oil-containment systems utilize booms to surround the spill until the oil can be collected. Boom systems have a number of designs, some of which employ oil sorbent materials in their construction. However, oil-sorbent booms are not designed to sorb substantial amounts of oil, but rather are generally used to retrieve a sheen or a small oil spill or to prevent the spill from expanding or reaching a protected area such as a shoreline until it can be collected by mechanical means, typically utilizing skimmers or oil-recovery boats.

Containment systems employing traditional booms have numerous problems. Deployment of some booms requires specialized equipment, which can be slow and difficult. If the spill is large, surrounding the spill may not be possible due to lack of sufficient boom resources. All of these problems can delay response to the spill. Therefore, boom and skimmer systems do not work well in rough water or near obstacles.

Delayed response to a spill results in a number of deleterious changes. A spill spreads uncontrollably and rapidly to a thin layer on water (less than 1 mm in many cases), making containment extremely difficult if not impossible. If close to shore, the oil may wash ashore, causing severe environmental damage. Lighter fractions of the oil (volatile organic compounds) are released into the atmosphere, resulting in hydrocarbon air pollution. The oil will undergo aging and emulsification, which can cause the oil to sink, making cleanup even more difficult. All of these changes cause the cleanup of the spill to become much more difficult, increase the environmental impact, and raise the financial cost of the cleanup.

There has been a need for some time, therefore, for an oil-recovery system that would (1) permit faster response, (2) work better in adverse conditions, such as rough water or near shorelines and obstacles, (3) prevent more of the oil from sinking, (4) contain the extent of the oil spill more quickly, (5) permit easier and more flexible deployment, (6) allow for easier collection, (7) permit economical recycling or disposal of the collected oil, and better protect the environment.

Accordingly, it is a primary object of the present invention to achieve a more effective system for recovering oil from the surface of bodies of water, such as oceans, lakes, or rivers.

It is another object of the invention to provide methods and apparatus for applying oil-absorbent or oil-adsorbent materials to an oil spill quickly and easily, accurately, and with minimal disturbance of the environment.

It is another object of the invention to provide methods and apparatus for effectively containing water-borne oil spills, even under adverse conditions or near shorelines, rocks, and reefs.

It is another object of the invention to provide methods and apparatus for ameliorating oil spills both by containment, such as within a barrier, and by entrapping the oil in an oil-sorbent material.

It is another object of the invention to provide a means of improving the collection of spilled oil.

It is another object of the invention to provide systems for controlling and removing oil spills in areas of a body of water that are remote from collection vessels or in areas where shipping hazards or the oil itself prevent safe vessel operation.

It is another object of the invention to provide collection systems that do not need to rely on the presence of specialized boats or vessels but can work with them.

It is another objective of the invention to provide systems for controlling oil spills that provide for the economical recycling of the collected oil as fuel.

It is another objective of the invention to provide systems for controlling oil spills that provide for the disposal of the oil through in-situ burning of the oil.

The present invention achieves the above and other objectives by use of a plurality of water- and oil-porous containers or sacks that are partially filled with a number of generally toroidal bodies of a polymer material that entraps oil and including mesh fragments scattered throughout the bodies. Each sack is sewn in a novel way, with a perimeter stiffening ring, to retain a flat profile, and has a netting that closes to help inhibit outflow of the oil when the sack is retrieved. When deployed from ship or by air onto a spill, the sacks spread into a pancake shape and the polymer bodies form a single layer that retains the oil. The inventive sacks will float indefinitely without releasing the oil or allowing it to emulsify, so the oil can remain in place until collection efforts are feasible. The sacks can be burned in situ, or standard fishing boats or specialized collection boats can be used to retrieve the sacks, and the collected material can be burned to capture the energy content of the oil or processed to separate the oil from the polymer. The inventive sacks can be used in conjunction with other, known containment or retrieval equipment, such as booms or skimmers, if desired.

Thus, the inventive systems, devices, and methods can be used to permit easy and quick deployment of containment equipment, even if a spill is in an inconvenient or distant location, effective control of the spilled oil during any delays in recovery, and comparatively inexpensive and easy collection of the oil during the clean-up stage. The system is specifically designed for rapid deployment and efficiency in rough water.

Other aspects of the invention will be appreciated by those skilled in the art after a reading of the detailed disclosure of the present invention below.

BRIEF DESCRIPTION OF THE DRAWINGS

FIG. 9 is an isometric view of a preferred form of a polymer body used in the preferred sack of FIG. 2.

FIG. 10 is a top view of an alternative shape of the polymer body of FIG. 9.

FIG. 11 is a side view of a mesh fragment used in the preferred polymer bodies of FIGS. 9 or 10.

FIG. 15 is a view of another alternative preferred embodiment of the collection system of FIG. 13.

FIG. 16 is a view of a subsequent collection operation used in connection with the collection systems of FIGS. 13 or 15.

Common numerals are used in the several figures to indicate similar elements.

DETAILED DESCRIPTION

The system includes the application to the oil spill of hundreds or thousands of containers or sacks holding a quantity of appropriately shaped bodies formed from polymer-based compounds that are known to entrap crude or refined petroleum products, including crude oil of any viscosity and gasoline or other refined fuels. FIGS. 1 through 8 illustrate preferred embodiments of the inventive container, referenced as sack 10.

Figure 1:
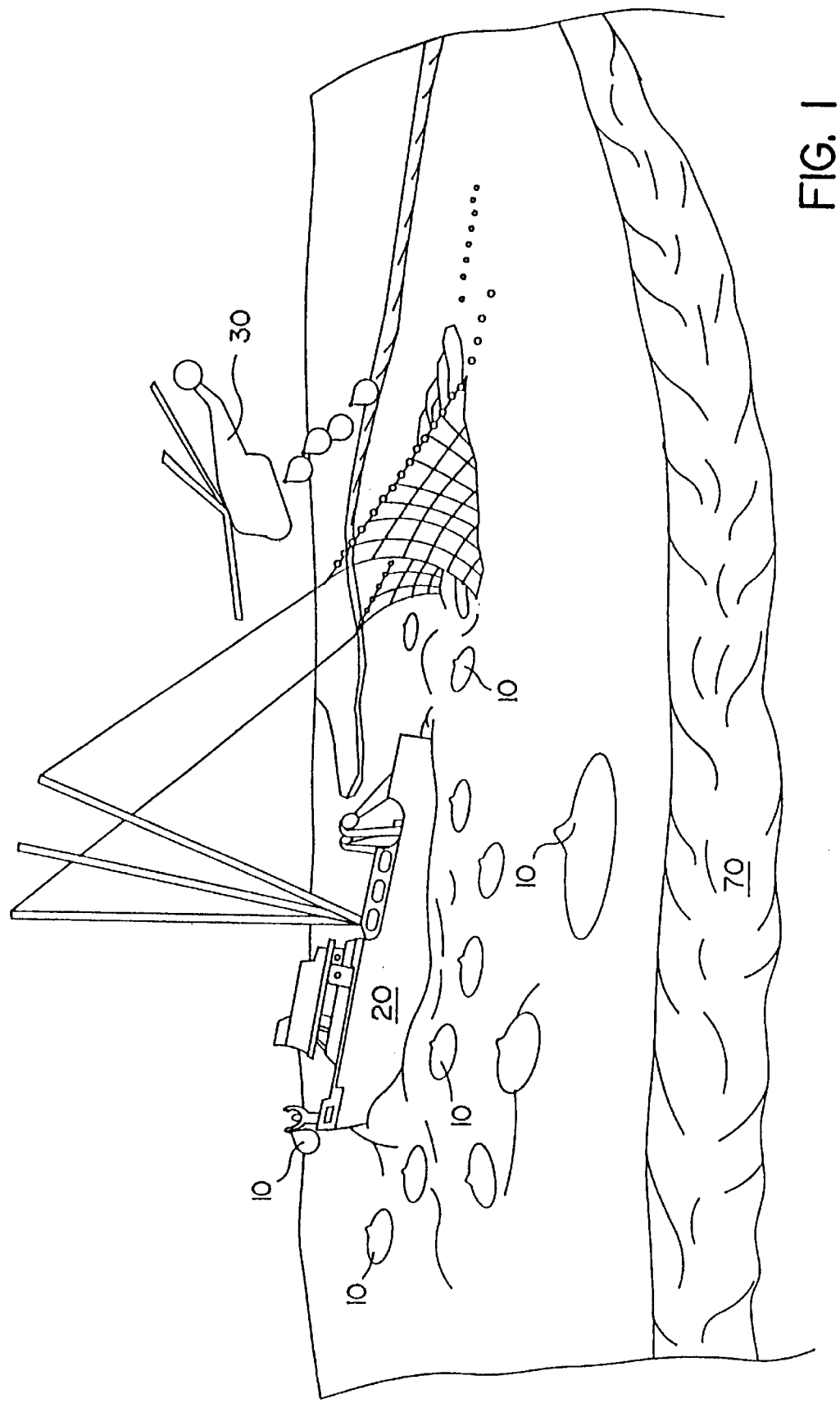
FIG. 1 is an illustration showing various aspects of the inventive system in use, particularly deployment and retrieval techniques.

FIG. 1 illustrates an oil spill and certain deployment and retrieval activities in accordance with the invention. To simplify the application, a number of different activities are shown in FIG. 1, although in practice, many of those activities may take place at different times or in different locations. In FIG. 1, a number of sacks 10 are shown being applied to an oil spill. The sacks are designed for easy application from floating platforms or ships, as shown at the left of FIG. 1, or from air, as shown at the right of FIG. 1. Although FIG. 1 illustrates application of sacks 10 from fishing boat 20, it is also possible to carry a quantity of sacks 10 aboard an oil tanker or other vessel (not shown) from which a spill might conceivably occur, as a precautionary measure. Such deployment is step 534 in the flowchart of FIG. 21.

FIG. 1 also shows a bundle of sacks 10 being dropped from helicopter 30 on a different part of the spill. The ability to deliver the sacks by air, such as from helicopters or light planes, or in bales from larger cargo planes, permits more rapid response to a spill, even if the spill is in a distant location or in a location that would be hazardous to approach by boat, such as in high seas, near reefs or other obstacles, in shallow water, or in the middle of a large spill. After all, spills only infrequently occur in convenient locations on calm seas. Also, air delivery allows application to a specific area of a large spill, which would be impossible for known sea-borne application methods. One specific area, usually near the center or leading edge of a spill, often contains 90% of the total oil in 10% of the geographic extent of the spill.

Figure 19:
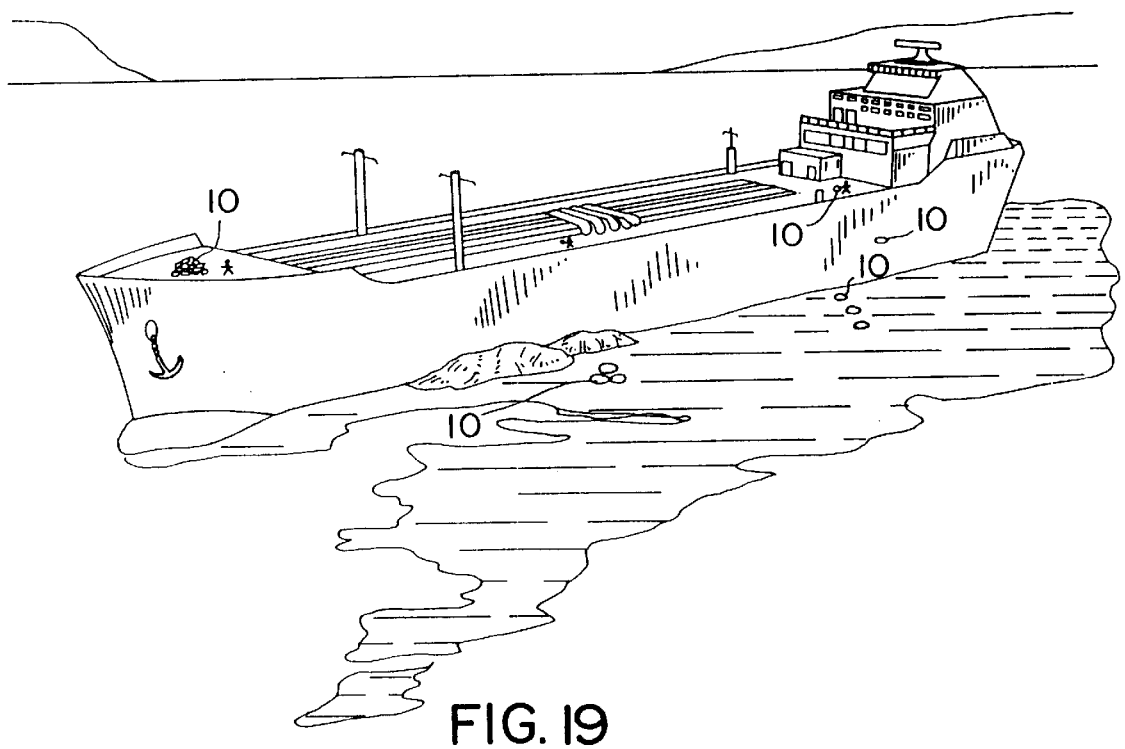
FIG. 19 is a view of a tanker leaking oil and workers deploying sacks like those of FIG. 2 directly from the ship.

The fact that sacks 10 are easy to deploy also permits the most rapid possible form of response, namely delivery from the very tanker that has caused a spill. Known spill-control systems typically require complex, specialized equipment run by well-trained crews, and cannot be readily deployed from tankers. The inventive delivery system, by contrast, is simple enough to be deployed by tanker workers who are not skilled in handling spills, and inexpensive enough to be carried aboard tankers. FIG. 19 illustrates such a deployment method. It is not likely that an on-board tanker-delivery system can cure the entire spill, but prompt application of a quantity of sacks 10 can assist in the initial clean-up by slowing the spill rate and reducing the extent of spreading and quantity of unrecovered oil.

Figure 2:
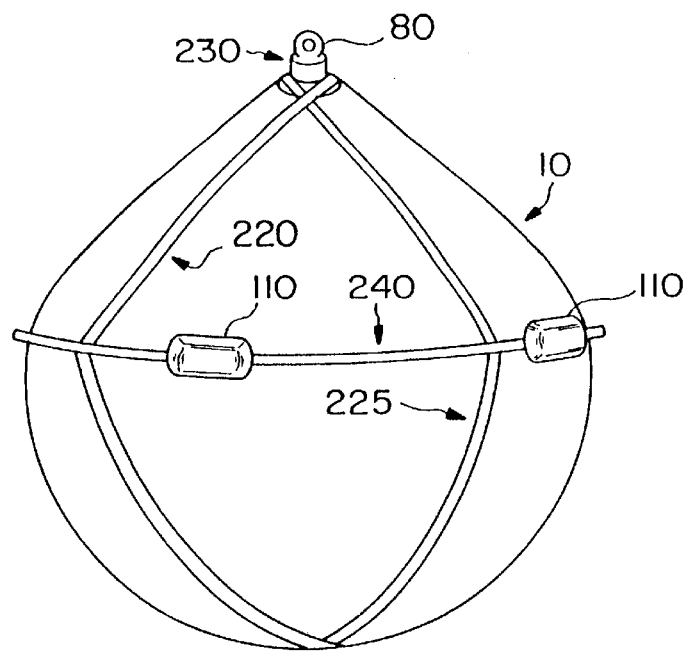
FIG. 2 is an isometric view of a preferred sack used with the inventive systems and methods, depicted in a state before the sack is deployed.

FIG. 2 shows that sacks 10, before deployment, are shaped in a relatively compact form, suitable for easy storage. As seen in the cross-section of the preferred embodiment of FIG. 3, each sack 10 is only partially filled, such that approximately 25–30% of the volume of the sack contains material that can entrap oil. Thus, each sack 10 can be compressed (not shown), such as with laces or ties, into a volume much smaller than the volume occupied by the sack when it is fully inflated. Bales of thousands of the sacks can be created.

In a preferred embodiment, each sack 10 may measure several feet across and contain from a few pounds of material that can entrap oil to hundreds of pounds. Although larger sizes are also suitable, sacks 10 that measure three feet across have been found useful because of the ease of handling and flexibility of application. As shown in FIG. 1, a large quantity of sacks 10 can be deployed on an oil spill, as densely as economically possible. However, it is preferred to allow gaps between the sacks, to avoid their coming into contact with each other, which increases the chances that the oil will pass into contact with unused sorbent material. (In an alternative embodiment discussed below, where the sacks are formed into a boom, no gaps would be present, to form a continuous barrier.)

Figure 3:
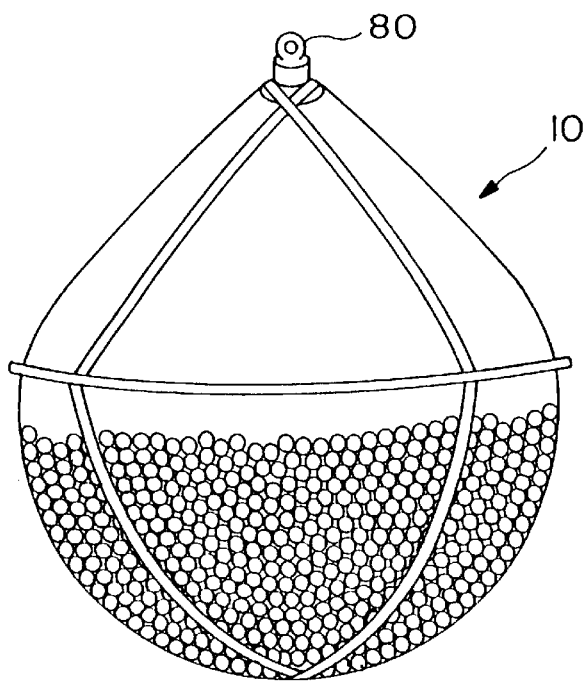
FIG. 3 is a side, cross-section of a preferred sack used with the inventive system, as it would appear before deployment.

FIG. 3 shows a cross-section of one such sack holding bodies of the oil-encapsulating polymer. When deployed on open-water surface 50, however, sack 10 expands to a flat, pancake shape, as shown in the cross-section of FIG. 4. In that shape, the interior volume of sack 10 becomes smaller than the volume of the same sack in FIG. 3, so the material that can entrap oil may comprise approximately 80–85% of the volume, in a layer that is a few inches thick.

Figure 4:
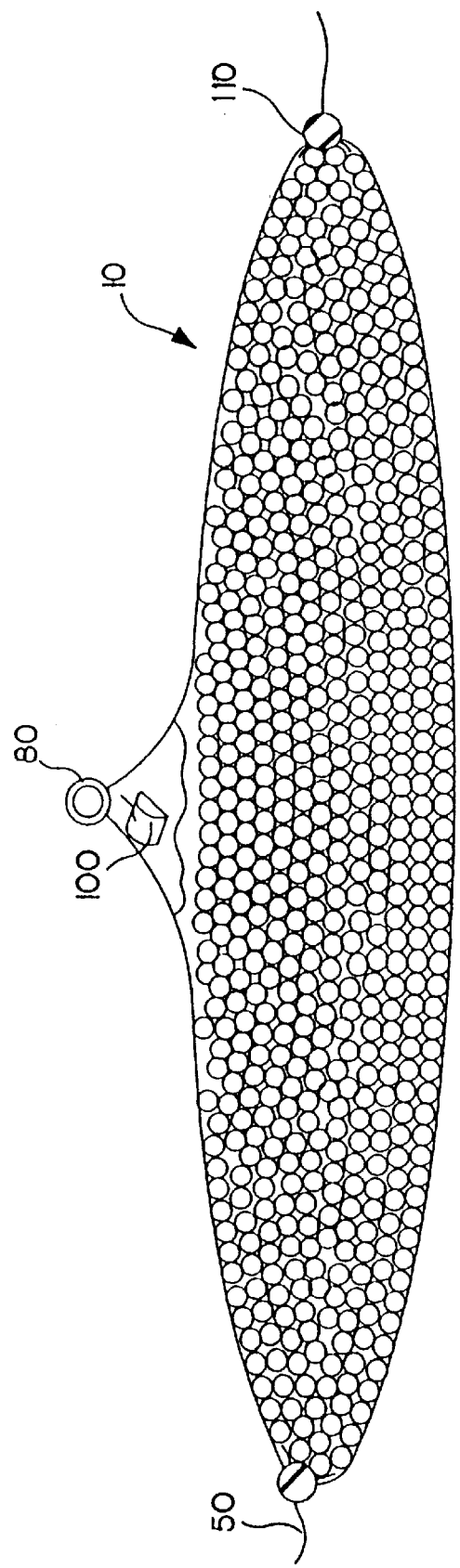
FIG. 4 is a side, cross-sectional view of the sack of FIG. 2, as it would appear after deployment on open water.

It has been found that sacks 10, when dropped onto open water 50, will quickly expand into the configuration shown in FIG. 4, because of the impact of the sack and subsequent wave action. Thus, sack 10 is designed to permit the material inside to spread out across the area covered by the sack relatively uniformly. It is not necessary, therefore, to take any positive action to ensure that the polymer extends across the maximum possible extent.

Sacks 10 will float on the surface of the oily water, and oil coming into contact with the material contained inside sacks 10 will become entrapped by those polymers. Because the polymer material is hydrophobic, however, it will not become water-logged. It has been found that sacks 10 containing polymers will float on the surface of oily water for at least several weeks, and perhaps indefinitely, without sinking, releasing the oil, or allowing it to emulsify.

The polymer material in sacks 10 can be of one color, such as white, and change color, such as to black, when oil is entrapped therein. Further details of the polymer material are specified below.

An optional feature shown in FIGS. 2 and 3 is one or more buoyant elements 110, sewn to the material of sacks 10 at the level of the water-line. That feature assists in ensuring that sacks 10 have high visibility during prolonged periods on the spill. Also if other objects, such as a heavy type of cable, is attached to the sacks 10, the buoyant elements 110 can assist in helping the sacks remain afloat.

As also shown in FIG. 1, at later stages of clean-up, booms 70, of the sort known in the prior art, can be deployed and used with sacks 10. However, sacks 10 can ameliorate even non-contained spills before booms 70 are deployed.

FIG. 1 also shows techniques of recovering oil-soaked sacks 10. Because the sacks float and stabilize the oil in self-contained and self-sustaining sacks, special equipment is not needed to collect the oil. For example, FIG. 1 shows an ordinary fishing trawler 20 using its net to scoop up quantities of oil-logged sacks 10. Although it is not required, the use of the inventive system does not preclude the utilization of more sophisticated collection boats, such as scoop boats or high-speed oil response vessels, such as known in the art. For example, if a large spill is contained in the vicinity of a base for such equipment, it may be advantageous to use such boats to collect sacks 10 at the same time as floating oil not yet held by sacks 10 is skimmed from the surface. It is also possible to fish sacks 10 out of the water using a hook. Alternative collection systems are discussed below in connection with the descriptions of FIGS. 11 through 15.

An optional feature of sack 10 is a small radio transmitter 100, such as shown schematically in FIG. 4, which can emit a constant signal of pre-defined characteristics. Transmitters such as those used in scientific research to tag birds or animals are of one type that may be suitable. Alternatively, numeral 100 can comprise a patch of radar-sensitive material.

Such a location device 100 can permit prompt location of sacks 10 that have floated beyond the extent of the spill or otherwise been lost. Also, in cases where sacks 10 are dropped in a remote location by air, location device 100 can provide boats approaching a spill with easy navigational guidance, allowing recovery boats to locate the spill and other boats to avoid inadvertently sailing into the midst of the spill.

Figure 5:
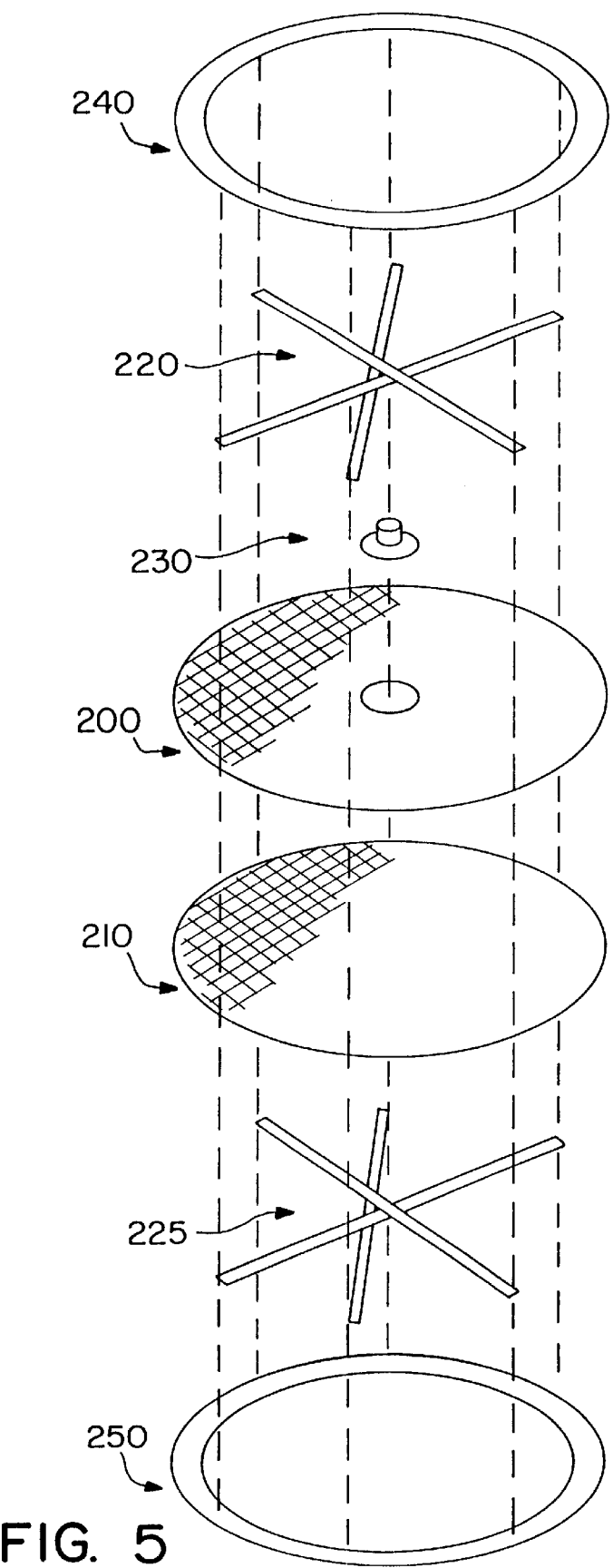
FIG. 5 is an isometric assembly diagram showing elements of the preferred sack of FIG. 2.

FIG. 5 shows more details of the basics of a preferred embodiment of one of the sacks 10.

The outer material of sack 10 is formed from two layers 200, 210 sewn together. The polymer-based material described below is placed inside sack 10 between those two layers. The layers 200, 210 can be formed of polypropylene, plastic, string or cord such as used in ordinary fishing nets, nylon, or another suitable material. In one suitable embodiment, a woven mesh formed of polypropylene was used. That material is a strong material that is highly resistant to tearing, and if a small tear or rip opens in the material, the material will resist its extension.

It is necessary, however, that the sack material have enough porosity to allow passage of the spilled oil to the absorbent bodies contained therein. Material having gaps of three eighths of an inch has been found most suitable, particularly for use on crude oil.

The necessary porosity of the sacks will depend, however, on the weight of the oil being collected. For example, a tight mesh may work on diesel or gasoline spills but not on heavier crude oil. In one test, a fabric measured as having air permeability of 150 cubic feet per minute at a half inch of water was found suitable for absorbing diesel fuel but not crude oil.

The material of the sack, however, must be sufficiently non-porous to contain the encapsulating polymer matter. If the polymer bodies specified below are used, even sack material having high porosity will be able to contain the absorbent material without leakage. Thus, larger bodies have the additional advantage of promoting the desirable goal of using high-porosity sack material, which permits better passage of oil.

Forming the outer material of sack 10 from two layers 200, 210 sewn together is particularly advantageous in helping sack 10 lay flat on the water, while also reducing the chance that the sack will fold over onto itself, which is undesirable because it limits the extent of sack 10. The flat configuration further assists in distributing the weight of the sack across its entire lateral extent, which helps in preventing bursting from concentrations of oil-filled polymer at any particular point. The use of dual layers also promotes the wave action of the water helping to spread out the sack, as opposed to ordinary designs, in which wave action causes problems. Thus, use of the inventive system permits improved collection in actual conditions encountered in real oil spills.

Outside of layers 200, 210 are two webs 220, 225 formed of 1.5 inch wide polyester seat-belt webbing. Material with a yarn count of 1,300 per inch and a breaking point of 4,000 pounds has been found more than sufficient for the loads encountered. For smaller sized sacks (three foot diameter or smaller), polypropylene webbing with a breaking point of 1,200 pounds can be used. Webs 220, 225 assist in preventing or limiting the extent of rips or tears in layers 200, 210.

Webbing rings 240, 250 are placed around the perimeter of sack 10 outside of webs 220, 225. Nylon webbing about 4 cm. wide with a warp yarn count of 1,680 per inch and breaking point of 6,000 pounds has been found suitable. Webbing rings 240, 250 hold the elements shown in FIG. 5 together while creating a stiffer edge of sack 10, which (as discussed above) helps allow sack 10 to lie flat in the water without folding over onto itself, even when dropped from the air from any original configuration. Such formation of sacks 10 of dual layers (like 200, 210) of stiff-edged mesh (such as created by rings 240, 250) is step 530 in the flowchart of FIG. 21. Webbing rings 240, 250 are narrow, to increase the encounter rate of the polymer in still-water conditions. For smaller sacks, two-inch polypropylene webbing with a breaking point of 2,400 pounds can be used for webbing rings 240, 250.

If desired, during recovery, webbing rings 240, 250 can be hooked to pick up sacks 10.

The members of web 220 are sewn so as to leave an opening for the neck of flange 230, which can be made of hard plastic dip-molded material such as PVC. The base of flange 230 is attached between web 220 and layer 200, such as by sewing directly through the material of the plastic. Flange 230 is used as a port through which the polymer material can be inserted into sack 10 (as stated in step 532 in the flowchart of FIG. 21). On smaller versions of sack 10, a less expensive polypropylene filter cloth collar with drawstring (not shown) can be used in place of the capped flange. However, the erect shape of the flange helps during retrieval.

Figure 6:
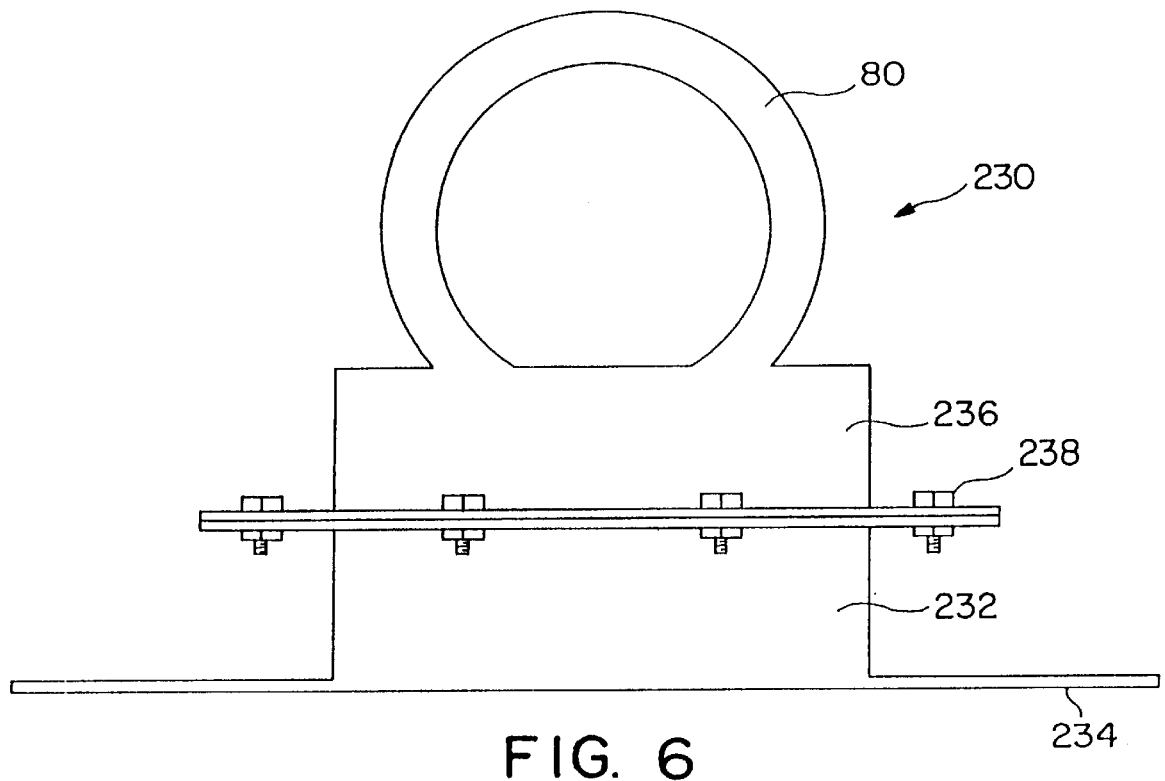
FIG. 6 is a side view of an optional flange used in the preferred sack of FIG. 5.

A closer view of flange 230 is shown in FIG. 6. Flange 230 has a neck 232 and a base 234, through which the sewing can be done. Cap 236 mates with neck 232, either with bolts and nuts 238, as shown, or through internal screw threads, not shown, or a combination of both. Eye 80 is formed, in the depicted embodiment, integrally with cap 236.

Shown in FIGS. 2 and 3 are optional floats 110, which can also be attached near the ends of the members of webs 220, 225 of FIG. 5 to add additional buoyancy.

Internal dividers (not shown) can optionally be used to further assist in preventing accumulation of polymer material at certain spots. Neon colors can be used on the webbing or rings to facilitate location of sacks 10 during retrieval.

Figure 7:
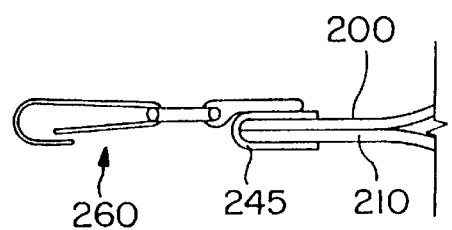
FIG. 7 is a cross-sectional view of the perimeter of an embodiment of the preferred sack of FIG. 5.

Webbing rings 240, 250 can also be formed of a single piece of material 245 that is folded over the edge of the perimeter of the assembly and stitched, forming a flat "U" shape in cross-section, as shown in FIG. 7.

Double and triple stitching, or zigzag stitching, techniques are preferably used to prevent seam rupture or load failures. The connector rings such as snap hooks 260 shown in FIG. 7 can be added to webbing rings 240, 250 near the ends of the members of webs 220, 225 and at the perimeter of webs 220, 225, to permit attachment of multiple sacks 10 together. When so attached, sacks 10 can be used as a boom substitute. To supplement the connector rings, ropes or cables can be added to assist in making deployment and retrieval adjustments without undue stress on the sacks 10.

Figure 20:
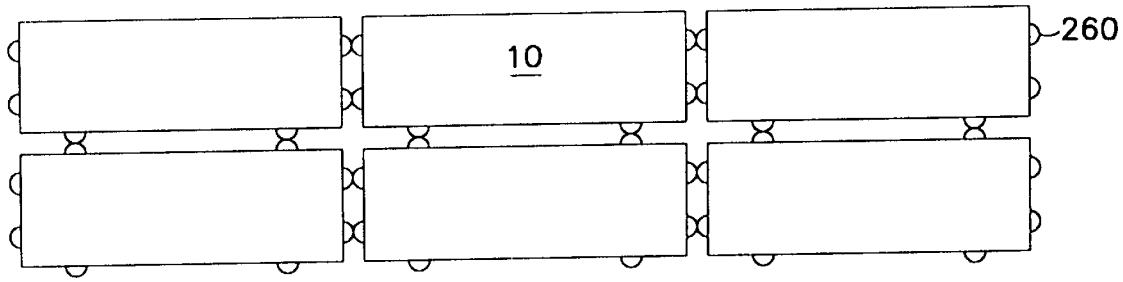
FIG. 20 is a section of a double-width boom composed of multiple sacks.

Although FIG. 5 shows a circular-shaped sack 10, other configurations, such as square or rectangular, are also possible. Rectangular sacks are well suited for boom usage. When so used, the boom in accordance with the invention acts as a blanket, having a sizeable width to cover a large surface area. In this form, on the largest spills, the connected sacks can form a boom extending up to half a mile or so in length and holding up to 50,000 pounds of sorbent material. A boom of this sort is particularly useful to deploy in contact with the leading edge of the spill. In addition, double-width or wider booms can be configured easily by hooking additional rectangles together in multiple rows. FIG. 20 illustrates a section of such a double-width boom, with sacks 10 of rectangular shape. Natural wave action works with such booms to prevent escape of oil. By contrast, wave action hampers the effectiveness of prior art booms, including those with a "skirt" arrangement.

Figure 8:
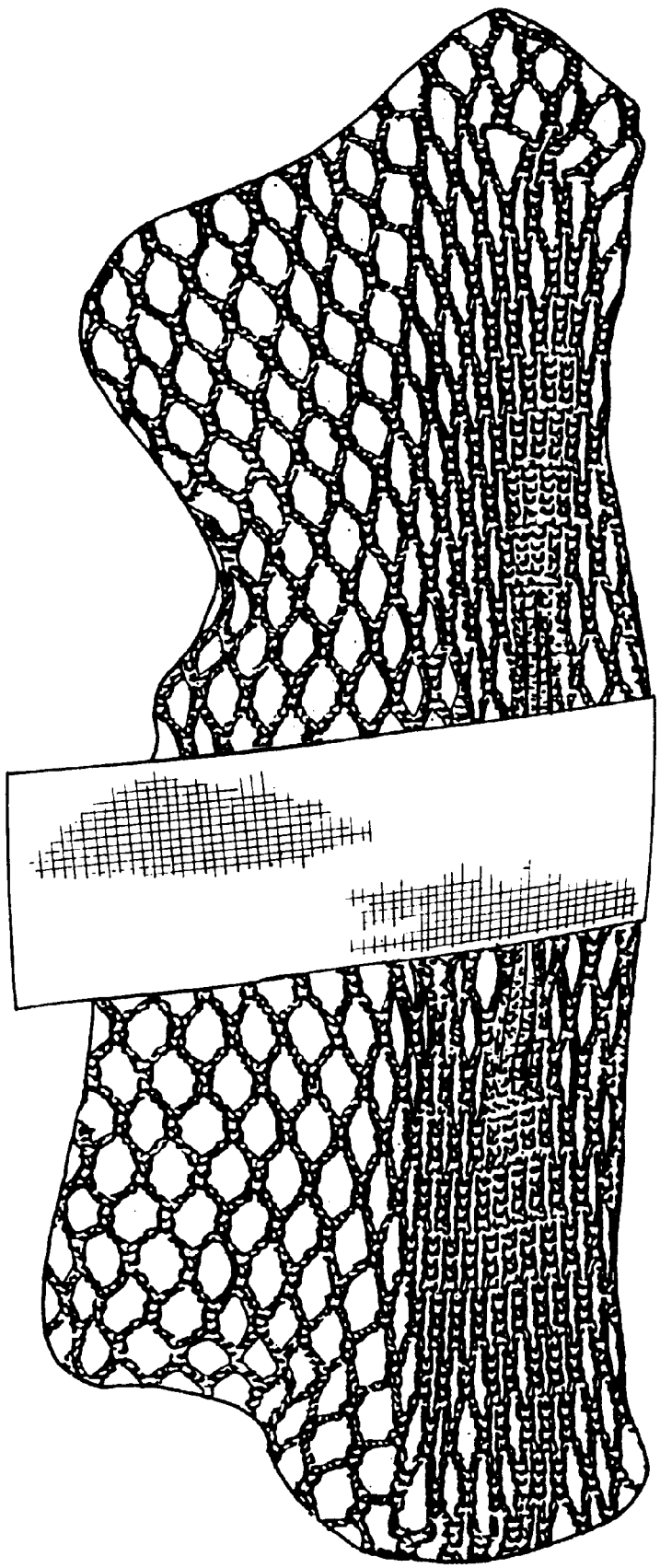
FIG. 8 is a view of a preferred way of attaching the webbing and mesh of the preferred sack of FIG. 5.

In a preferred embodiment, the members of webs 220, 225 are attached to the woven mesh of layers 200, 210. Specifically, the members are preferably oriented in the same direction as the major axes of the diamond-shaped holes formed by the mesh, which is usually perpendicular to the warp of the woven material of webs 220, 225. This preferred configuration is shown in FIG. 8. When sack 10 is picked up during retrieval with eye 80, the tension on the seat-belt members causes mesh 200, 210 to close, as shown in the lower half of FIG. 8. This facilitates the removal of sacks 10 containing the oil-logged polymer-based material while also capturing excess oil not entrapped in the polymer, or fragmented polymer flakes, that are inside sack 10 at the time of retrieval.

The unique construction of the sort shown in the examples of FIGS. 5–8 allows sacks 10 to expand on the surface of the water such that the formed polymer units spread into a single layer, creating a pancake shape and giving the sacks 10 minimal cross-sectional height on the spill, such as three inches. The arrangement limits the tendency of a sack 10 to fold onto itself, which can reduce the effectiveness of the system. It also causes the polymer units to disburse uniformly throughout the entire width of the sack 10, as the sewn layers of the sack prevent the sorbent material from forming into a pile, also improving effectiveness. Known containers tend to have bale-like or pillow-shaped appearances, which permit the sorbent material to form into a pile, creating the possibility of water-logged lower regions and upper regions that are out of the water. As a result, much of the sorbent material is positioned either above or below the oil slick in other known arrangements. Also, when the material becomes concentrated in a pile, the container can sink and interior parts of the material can be hidden, preventing them from encountering the oil.

The construction produces the flat profile in part for the following reasons: Webbing rings 240, 250 help flatten the profile of sack 10 by providing a stiff perimeter member. Also, in the circular arrangement, each segment of rings 240, 250 form a kind of an arch, creating tension that resists any tendency of webs 220, 225 to pull the perimeter radially inward.

The flat profile of sacks 10 therefore spreads the oil-absorbent polymer bodies into an optimal position for encountering the oil; that is, in a flat layer on the surface of the water. The encounter rate of the sorbent material with the oil is vastly improved with the arrangement shown, as opposed to known containers.

The arrangement of the sacks 10 combines with the natural buoyancy of the polymer bodies to allow sacks 10 to remain afloat on the surface of the water for at least a day, including for longer periods of time, such as weeks or months or more. Such maintaining of the sacks afloat is step 536 of FIG. 21. In one test, sacks remained afloat and effective for 16 weeks. Even over such extended time periods, the sacks 10 will hold the polymer bodies in a flat sheet fashion, whether or not the bodies have sorbed oil.

FIG. 9 shows an example of a suitably formed polymer body 300, for use inside sack 10. The body is formed from a polymeric material that is known to sorb oil, such as styrene-butadiene-styrene block copolymers and other styrene-diene block copolymers. Other polyolefinic materials are also known to sorb oil and could be employed. The styrene-diene block copolymers were developed for applications that require impact resistance, and this is still their primary use. As an oil-sorbent polymer styrene-butadiene-styrene block copolymer (SBS) is preferred. SBS is highly sorbent, non-toxic, and remains coherent after it is oil saturated; however, SBS has a tendency to become a gelatinous mass after entrapping large amounts of oil. Preventing this problem can be accomplished by (1) increasing the styrene content in the SBS from the 30%-styrene content that is presently commercially available to 40% or more styrene, or (2) by adding other, higher-styrene block copolymers, such as styrene-ethylenebutylene copolymers (SEB), which generally have lower oil capacity but better mechanical properties when oil-loaded. In an example of a preferred embodiment, a blend of approximately 90% SBS with approximately 10% SEB has been found to reduce the softening tendency while reducing the overall oil capacity by less than 10% over pure SBS. Blends between 85% and 95% SBS with the remainder SEB have been found suitable. Alternatively, using 43%-styrene SBS without SEB appears suitable as well.

Figure 17:
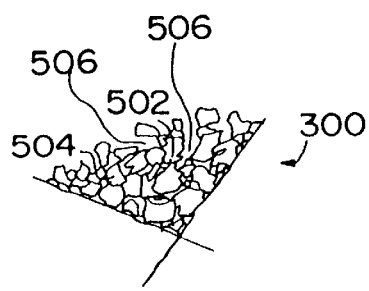
FIG. 17 is a partial section of a preferred form of polymer bodies like that shown in FIG. 9.

In a preferred embodiment illustrated in FIG. 17 large-grain polymers of the preferred mixture of SEB and SBS, each grain which is randomly shaped and approximately one twelfth of an inch across, are bound together by low-pressure compression molding in the presence of elevated temperature. In FIG. 17, numeral 502 depicts a grain of SEB and numeral 504 depicts a grain of SBS. For example, pressures between 8 and 20 psi and temperatures between 150 and 250° F. have been found suitable to manufacture a product with high absorbency and high retained coherency after absorbing oil. The high temperature slightly melts the grain surfaces to agglomerate the material into a coherent body. Quicker manufacturing results can be obtained by preheating the granular stock to between 130 and 250° F. Further, using a mold that is colder than the preheated stock, such as at 70–100° F., reduces the chance of the material forming a smooth "skin," which impairs entry of the oil.

A hydrophobic additive, such as hydrophobic silica, has been found to greatly improve the capacity of the material to absorb oil, without taking up water. The additive can be added to the granular stock before molding.

The grain size is important, and the density of the resulting body is controlled, to prevent the body from absorbing oil only on its outside, a phenomenon called "matting" or "gel blocking." In this undesirable effect, the first quantity of absorbed oil combines with an outer layer of grains to form a barrier to further absorbing by inner layers of grains. With the preferred density, the final bodies 300 are also less likely to dump to each other when soaked with oil, which also improves sorbency.

Density values greater than 0.65 g/ml tend to prevent the oil from entering the bodies, while density values smaller than 0.55 g/ml cause the bodies to fragment after absorbing oil. For example, 6-mesh material can be used to make formed polymer parts with a density of between 0.55 and 0.65 g/ml, which permits enough voids between grains (see, e.g., voids 506 in FIG. 17) to permit oil to penetrate substantially throughout the thickness of the bodies without causing the soaked bodies to fall apart. Mesh sizes in the range of 4 to 40, with a preferred size of 6, have been found suitable.

Because of the desire, as noted above, to allow the material to remain in a flat layer, it is desirable to create a relatively large body 300, so that the material does not pile on top of itself. However, large bodies result in a greater distance between outer surface 310 and center surface 320, which is disadvantageous because oil would require a much longer time of exposure to soak into the center. Because in real oil spills, a particular quantity of oil may encounter the body only sporadically, in a large body, the center material largely remains unused.

Figure 21:
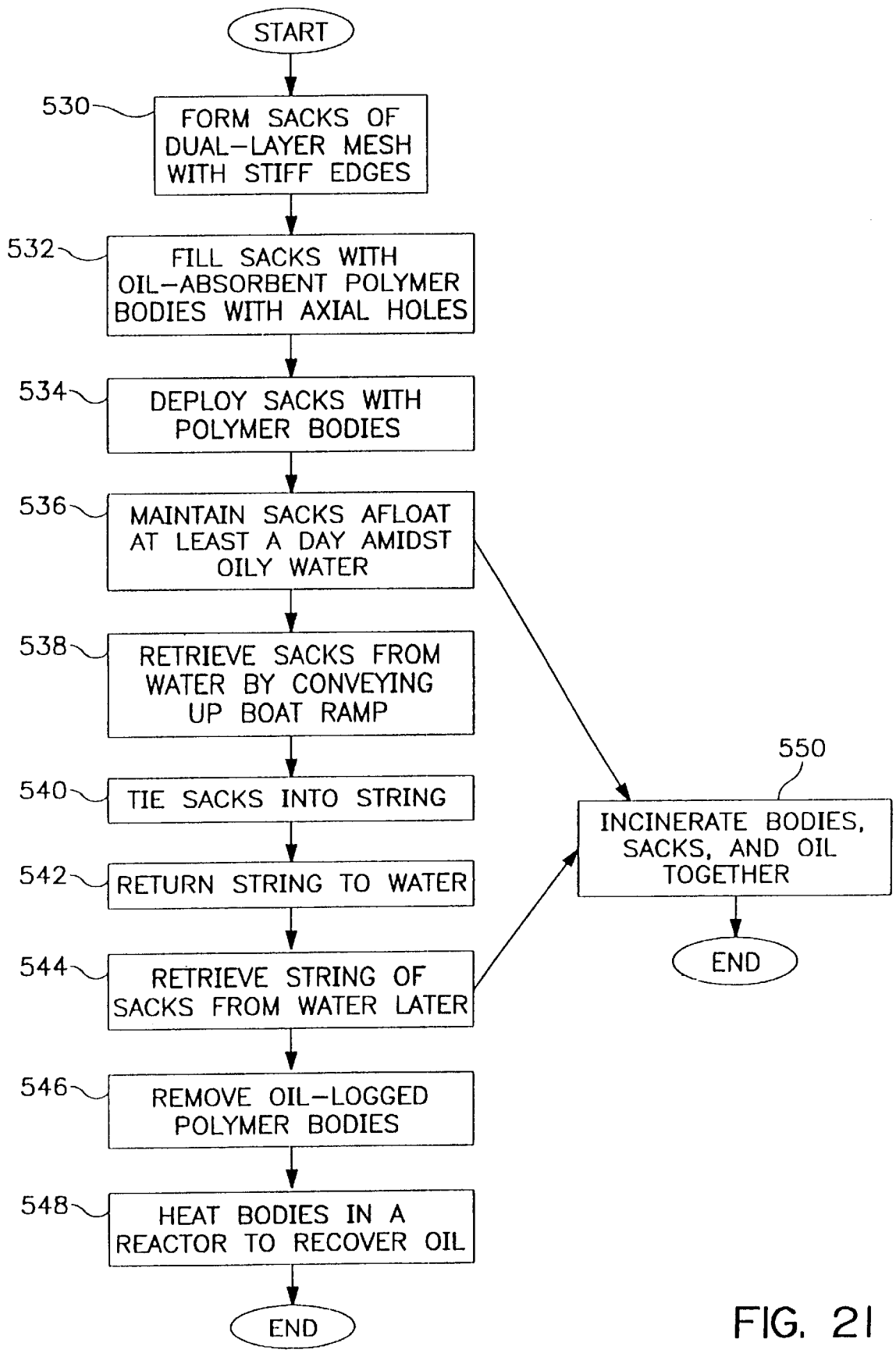
FIG. 21 is a flowchart describing a method of forming, collecting, and disposing of the inventive sacks.

A preferred embodiment that solves this dilemma uses a generally toroidal shape for the bodies 300 (as further stated in step 532 in the flowchart of FIG. 21). For example, a "doughnut" with an outer diameter from 0.5 to 4 inches (with a preferred size of about two inches), and an inner diameter of about 0.25 to 2.5 inches (preferred one inch) can be formed, with a thickness of about 0.25 to 1.0 inches (preferred 0.5 inch), which results in a body 300 as shown, which has all of its material less than one half inch from any surface. The use of a relatively large inner hole allows water and oil to pass through and between the bodies 300 easily, thereby improving the chances of oil encountering a polymer surface. Thus, removal of material from the center of the body 300 reduces the amount of material in each unit, without significantly reducing the quantity of oil absorbed, which further improves the quantity of oil entrapped per unit quantity of polymer.

Figure 18:
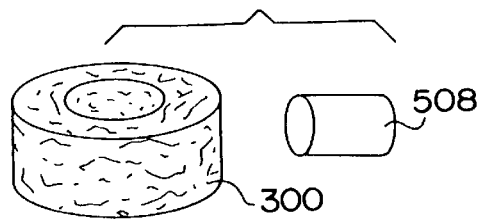
FIG. 18 is an isometric view of a pair of polymer bodies of different shapes, for use in a common sack.

The "plugs" of material removed from the center of the bodies 300 can be added as well to sacks 10, which results in a mixture of different-shaped bodies in sacks 10. FIG. 18 illustrates such a toroidal body 300 and plug 508 consisting of material removed from its axial hole. Using such a mixture of bodies 300 is advantageous over the use of a uniform type of body, because regular-shaped bodies can become arranged in a more fitted-together fashion, reducing the quantity of interstitial space, which thereby lowers the encounter rate.

To increase the surface area of the bodies 300 somewhat, consequently lowering absorption time, without increasing the distance from surface to center, and for ease of manufacture, generally toroid-shaped bodies 300 can be formed in an octagonal or "nut" shaped structure, either or both on the inside surface 320, or outside surface 310. FIG. 9 shows a shape in which both outside surface 310 and inside surface 320 are octagonal. Any polygonal shape can be used as well. FIG. 10 shows an alternative body 340, in which the inside surface 320 is round but the outside surface 310 is octagonal.

The body 300 of FIG. 9 and the body 340 in FIG. 10 both have a square cross-section, measured along any half-plane extending from the central axis that passes through the center of the central hole inside interior surface 320. An ordinary toroid has a round cross-section. However, the corners formed by the square cross-section and the nut-shaped octagons act to increase surface area, without substantially increasing the distance from the interior material to the nearest surface.

To further increase surface area, and to promote quick capture of oil, it is desirable to have inner and outer surfaces 310 and 320 roughened somewhat. The same is true of top and bottom surfaces 350 and 360. It has been found that compression molding leaves a smooth surface patina, so it is preferred to cut or stamp bodies 300 from sheets or blocks of molded material. Cutting from sheets roughens surfaces 310, 320, while first cutting the sheets from blocks roughens surfaces 350, 360. Also, the sheets or parts can be molded in a rough-sided dimple mold.

Each of the resulting bodies 300 weighs between 2 and 20 grams (preferred 5 or 6 grams) and can absorb about ten times its weight in diesel fuel, for example, with 80% of the total being absorbed in the first ten minutes. In a six-foot diameter sack 10, about 60 pounds of material is suitable, which represents about 5,000 of the bodies 300 or a quantity somewhat less than that number but also including a number of cylindrical or octagonal "plugs." In an actual test with petroleum, such a sack absorbed over seven times its weight in 1.5 hours, while the same volume of material not in the toroidal shape absorbed only four times its weight, even in the longer time of 2.5 hours.

To improve structural integrity of the resulting bodies, structural fibers can be added. A preferred embodiment includes chopped sheets of polypropylene plastic mesh with holes about 1/16th of an inch wide, cut into fragments between one-eighth and one-half of an inch. The mesh fragments are mixed with the polymer grains before molding, which results in a body 300 that contains randomly oriented squares 330 internal to and throughout the structure. FIG. 11 shows a representative mesh fragment 330. Temperature changes and loads permit the resulting body 300 to flex a bit, thereby preventing cracking or breaking. After the polymer material collects oil, the mesh fragments 330 strengthen the bodies 300 but do not restrict the volumetric expansion that results from sorbing the oil. The mesh of fragments 330 can also be an oil sorbent.

Figure 12:
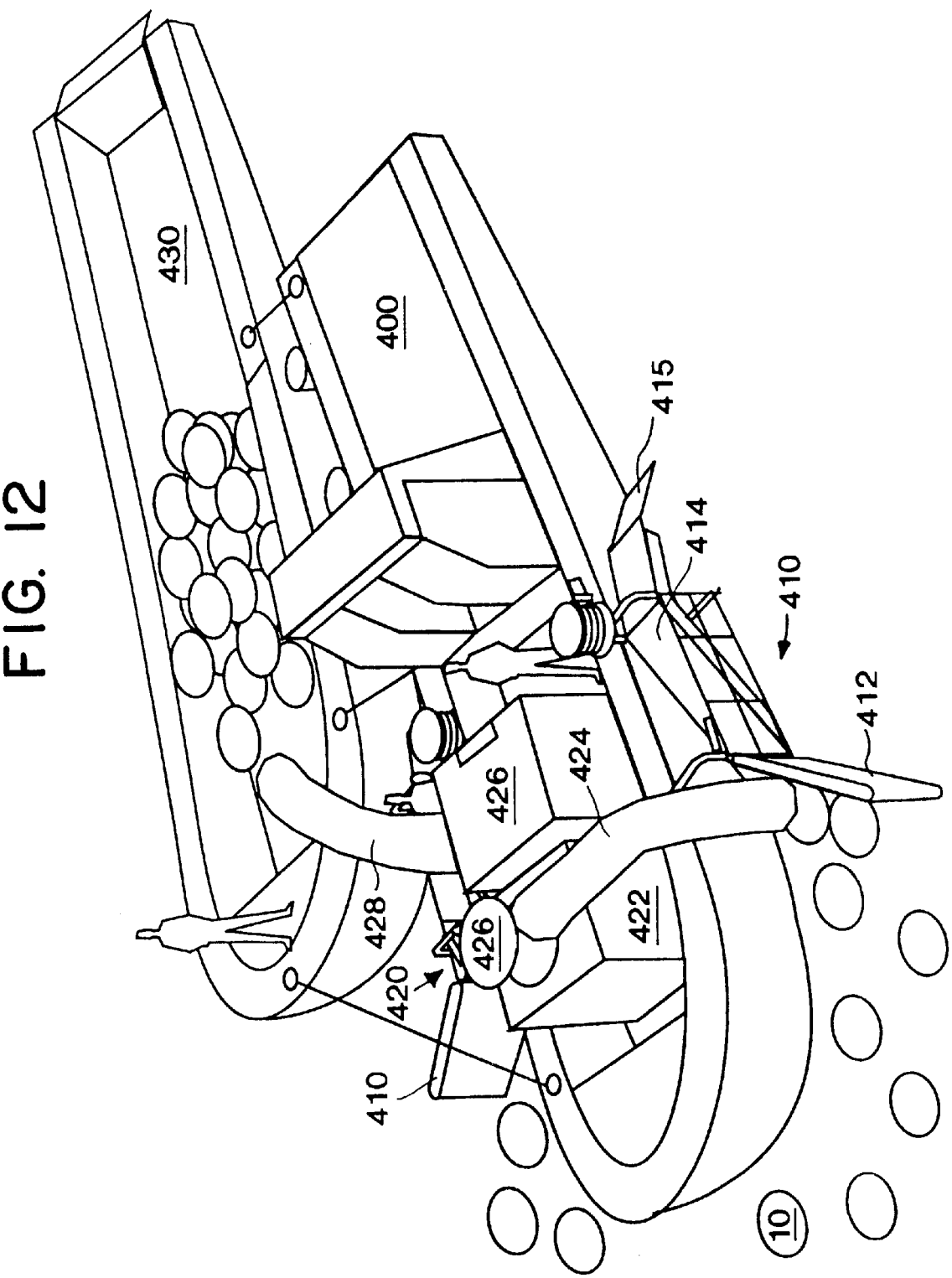
FIG. 12 is a view of a preferred embodiment of a collection system.

FIG. 12 shows a collection method in which a specialized high-speed boat 400, such as a modified version of boats operated presently by Team One of Seattle, Wash., approaches the spill on a rapid-response basis. Specially fitted outrigger paravanes 410 are deployed upon arrival, and sacks 10 are collected in wings 412 of paravanes 410 as boat 400 slowly advances. In rough-water conditions, sacks 10 are dropped onto the spill or in advance of the spill by air. Because sacks 10 retain the oil indefinitely, boat 400 can wait until the rough-water conditions dissipate to arrive on the scene and complete containment and recovery procedures, without risking dissipation of the spill by winds and seas, thus minimizing environmental damage without risk to recovery boats and crews.

A vacuum airstream conveyance and transfer (VACT) system can be used to collect sacks 10 using airstream induction (as opposed to pure vacuum pressure). An example of such a system already on the market and known to the ordinarily skilled artisan is called the Linductor system, available from Linductor, Inc. of Seattle, Wash. Material describing and depicting the Linductor is hereby incorporated by reference. This Linductor device was developed for transferring bulk solids or volumes of liquids, including removing spilled oil from the surface of water. It has been found that a VACT system that is a variant of the Linductor can be used to gather sacks 10 containing spilled oil more expediently in certain sea conditions. The Linductor system as marketed and if mounted on an appropriate vessel, such as a barge, is capable of picking up sacks up to three feet in diameter, but modifications can be made to allow pickup of larger sacks and conveyance on a smaller vessel.

Such a modified VACT system 420 is depicted in FIG. 12, including receiving tank 422, widened intake pipe 424, turret assembly 426, power and induction fan unit 426, and outlet pipe 428. Turret assembly 426 rotates to permit intake pipe 424 to be moved to any desired location next to the bow of boat 400. It is possible to configure a VACT system to use two intake pipes, one on either side of the bow (not shown). Outlet pipe 428 is optional, because sacks 10 can be retained in receiving tank or bladder 422, or an interior connection (not shown) at the bottom of tank 422 can allow sacks 10 to drop into a hold of boat 400, or an outlet ramp (not shown) on a side of tank 422 can allow sacks 10 to exit tank 422 and accumulate in an adjacent pile. In the configuration depicted in FIG. 12, however, sacks 10 are discharged through outlet pipe 428 and hurled through the air into a lightweight sled 430 towed along the side of boat 400. A powered barge can be used instead of a towed sled.

Figure 13:
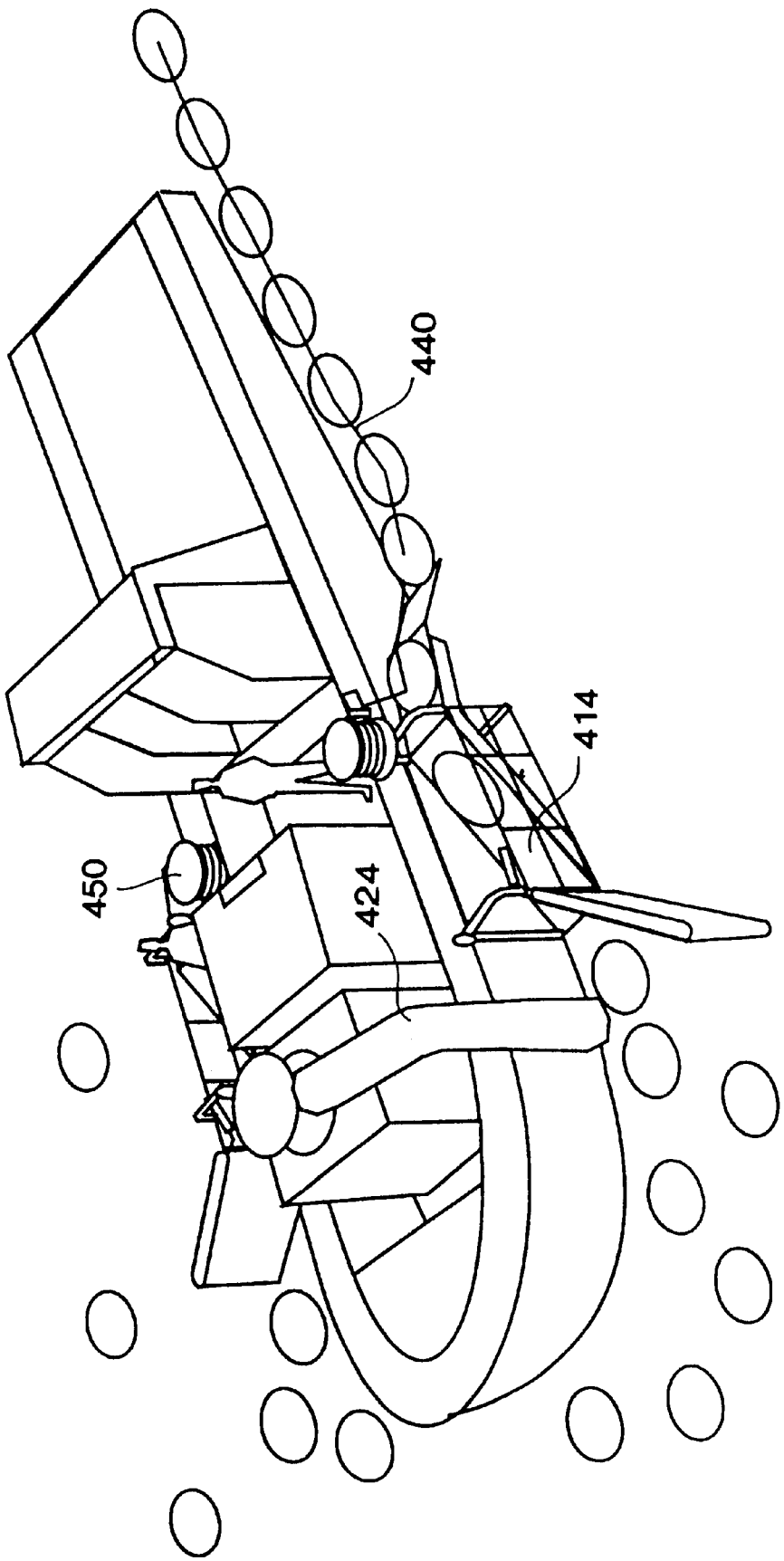
FIG. 13 is a view of an alternative preferred embodiment of the collection system of FIG. 12.

FIG. 13 shows laborers tying retrieved sacks 10 to lines or cables 440 pulled manually off of spools 450, to form towed strings of sacks that can be collected later. Those units of sacks 10 that miss intake pipe 424 are carried slowly up ramps 414 of paravanes 410 and attached manually to lines or cables 440, such as with snap hooks, after which they are slid back down to the water on a slide 415, such as made of stainless steel. FIG. 15 shows an alternative embodiment in which the VACT system is deleted, and manual collection and arrangement into strings is done exclusively. Such conveying of the sacks up a boat ramp and forming strings of sacks are steps 538 and 540 of FIG. 21.

Figure 14:
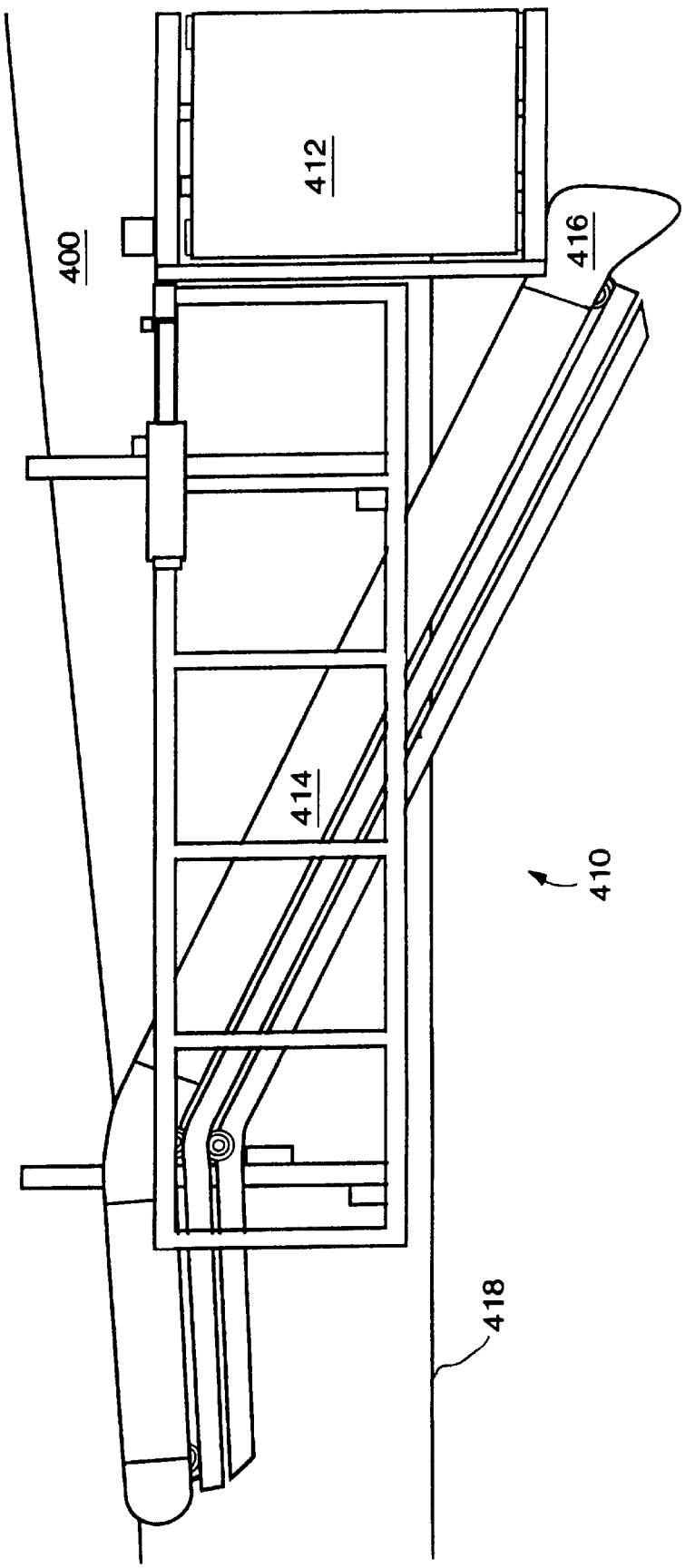
FIG. 14 is a side view of a paravane assembly used with the embodiments of FIGS. 12 and 13.

FIG. 14 shows details of a hydraulically powered paravane 410, as viewed from the far side of boat 400 in FIGS. 12 and 13. Ramp 414 can be tilted from an initially horizontal travel position to drop scoop 416 below waterline 418. Thereafter, the hydraulic system can spread wings 412 from the travel position to the 45-degree angle shown in FIGS. 12, 13, and 15. Ramp 414 includes a powered conveyor, with a surface that can be made of a lightweight, wide mesh fabric, such as made of a Velcro material, that can grip and feed sacks 10 from scoop 416 up ramp 414. Although paravanes 410 are depicted as being supported by boat 400, they can alternatively be mounted on one or a chain of sleds, similar to sled 430, towed along the side of or behind powered boat 400.

In the collection methods depicted in FIGS. 13 and 15, after a quantity of sacks 10 are tied into a string, the line 440 can be cut and the chain of sacks released to allow it to float in the water. Such returning strings of sacks to the water is step 542 of FIG. 21. Then, a workboat can assemble a number of strings together and attach an anchor or buoy 480 to the group of strings, preferably by attaching it to the middle of each string, forming a streamer-like arrangement 460, shown in FIG. 16. Anchor or buoy 480 can support a radio transmitter-like element or radar-sensitive patch 100 in FIG. 4, for ease of later location, instead of that element being on each sack 10. Streamers 460 can remain afloat until a collection boat or towed sled 470 attaches a line to anchor or buoy 480 and pulls the assembly aboard. Such retrieving strings of sacks is step 544 of FIG. 21. Once loaded, sled 470 with its chains of sacks 10 can be towed to shore with barges.

The inventive configuration of sacks 10 permits another disposal method, which has been considered desirable but which is difficult if not impossible to achieve in actual practice, namely in-situ burning on the water. In-situ burning prevents the need for the boat collection techniques described above.

Sacks 10, either alone or in assembled chains or "streamers," can be easily ignited on the water, which creates a wicking or torch effect, thereby burning not only the sacks but also unabsorbed oil surrounding the sacks. Such incineration of sacks, together with bodies and absorbed oil, is step 550 of FIG. 21. Previous attempts to burn oil spills on water have suffered from numerous difficulties, particularly the problems in ignition caused by rough water, thin oil slicks, or high emulsification. Articles describing various prior attempts at in-situ burning and the problems faced by such attempts are submitted together with this application and are hereby incorporated by reference.

If sacks 10 are transported to dry land, they can be disposed of as waste with the oil still intact, but this is costly and environmentally not preferred. Alternatively, sacks 10 can be incinerated on land, and the energy content of the oil and polymer can be recovered and used as power. To allow for such a disposal technique, it is preferred to use materials for the polymer bodies, for the outer material of sack 10, and for all other components of the sacks 10 that can be burned, to reduce the quantity of solid waste or air-borne pollution. Such incineration of sacks, together with bodies and absorbed oil, is alternatively shown as step 550 of FIG. 21. The preferred materials specified in this description are so suited. Another recycling use for oil-logged polymers is in road building.

Also, it is possible to remove the oil from the polymer using various processes, to allow recycling of the oil with no remaining hazardous material (or possibly reuse of the polymer product in sacks 10). For example, a fully automated process for extraction of refined oil from the polymer bodies has been developed within a reactor unit originally formed to break down scrap tire chips into the resalable commodities of scrap steel, carbon black, and refined oil. The reactor heats the oil-soaked polymer bodies in a sealed environment to break down the molecular structure of the polymers. Such a reactor is a modification of a scrap-tire reactor commercially available from Tire Recycling Technologies Corporation of Albuquerque, N. Mex., called the TRTM-60 tire decomposition machine.

A process flow diagram of the TRTM-60 is being submitted concurrently, and is incorporated herein by reference. Certain modifications to the TRTM-60 can allow it to work on oil-soaked polymer bodies, at a reasonable cost: (1) because of the salt content, a higher-grade stainless steel is preferred; (2) the discharge system is changed to eliminate the magnetic separator for carbon black and steel scrap, which is produced from scrap tire but not from polymer units; (3) a second, liquid seal is used at the discharge end; (4) the air condenser is replaced with a second water condenser; and (5) two screw conveyor stages are used instead of five.

As thus modified, the reactor works as follows:

The polymer bodies from sacks 10 are delivered to an inlet hopper of a sealed screw conveyor. (See step 546 of FIG. 21) Commercially available as a package with the TRTM-60 is information identifying certain additives that permit better breakdown of the scrap tire, and these additives are useful with the polymer bodies as well.

Two enclosed, horizontally oriented, stainless-steel screw conveyors stages, powered by individual hydraulic drives and a central hydraulic pumping system, move the material including the polymer bodies through the reactor while chemically breaking down the bodies while they are conveyed through the entire length. The conveyors have top inlets and discharge chutes at each end. The inlet connection to the reactor and the outlet side of the reactor are sealed, for example by liquid seals, to prevent oxygen from entering the process.

The reactor heats the material in a vacuum at 200–300° C. Each reactor conveyor has a perforated top to vent gases produced during the process. A vertical stainless steel plenum welded to each conveyor provides a means to collect these process gases. The gases are "pulled" off the top of the plenum by a turbine pump. The gas is then filtered to remove residue carried over from the reactor unit. The gases, consisting mostly of vaporized fuel oils, are then pumped through two separate condensing stages that are a water-cooled heat exchanger. Cooling is provided via an air-cooled process chiller with a circulating pumping system. Non-condensable gases are collected and recycled as the fuel medium for the burners, which can be used to maintain the temperature in the reactor unit or to power an electric generator, or can be discharged to a flare and burned.

Oil-soaked polymer material processed in this fashion can yield about half of the output as liquid hydrocarbons (See step 548 of FIG. 21). Indeed, about a quarter of the resulting liquid consists of styrene, which if separated by distillation, is five to ten times more valuable than crude oil, and can improve the recycling economics. An additional fraction of the total output, between 15 and 40% of the total, consists of gaseous hydrocarbons, which can be further processed to a hydrocarbon mixture that can be used as clean-burning fuel for the recycling reactor. The remainder, which is less than a fifth up to a third of the total, is solid residue or char, which is the only waste material. Optimization of the process parameters can result in a reduction or virtual elimination of the proportion of char produced.

Although the invention has been described with reference to specific embodiments, many modifications and variations of such embodiments can be made without departing from the innovative concepts disclosed.

Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase.

Likewise, the use of the word "function" in the specification is not intended to invoke the provisions of 35 U.S.C. § 112, ¶ 6 to define the invention. To the contrary, that paragraph will be considered to define a claimed element of the invention, only if the phrases "means for" or "step for" and a function, without also reciting in that element any structure, material, or act in support of the function, are specifically recited in that element. Moreover, even if the provisions of 35 U.S.C. § 112, ¶ 6 are invoked to define the invention, patentee intends that the invention not be limited to the specific structure, material, or acts that are described in the preferred embodiments. Rather, "means for" or "step for" elements are nonetheless intended to cover and include within their scope any and all known or later-developed structures, materials, or acts that perform the claimed function, along with any and all equivalents.

Thus, it is understood by those skilled in the art that alternative forms and embodiments of the invention can be devised without departing from its spirit and scope. The foregoing and all other such modifications and variations are intended to be included within the spirit and scope of the appended claims.

We claim:

1. A product comprising a body comprised of a multitude of grains of at least one hydrophobic, oil-encapsulating polymer material, which grains are bound together and surround an axial hole of the polymer body.

2. The product of claim 1 wherein the hydrophobic, oil-encapsulating polymer is a mixture of 5%–15% SEB grains and the rest SBS grains.

3. The product of claim 1 wherein the body substantially consists of the polymer grains.

4. The product of claim 3 wherein the body consists of the polymer gains.

5. The product of claim 1 wherein the body has polygonal outer and inner edges and square cross-sections.

6. The product of claim 1 wherein the body has an approximately two-inch outer diameter and an approximately one-inch interior diameter.

7. The product of claim 1 wherein the body has a polygonal outer edge.

8. The product of claim 1 wherein the body has a round inner edge.

9. The product of claim 8 wherein the body has square cross-sections.

10. The product of claim 1 wherein the body has an octagonal outer edge.

11. The product of claim 1 wherein at least some of the surfaces of the body are roughened.

12. The product of claim 11 wherein all of the surfaces of the body are roughened.

13. The product of claim 1 wherein the multitude of hydrophobic, oil-encapsulating polymer grains are agglomerated together through a multitude of connections between surfaces of adjacent pairs of grains, whereby the grains remain mostly unmelted.

14. The product of claim 13 wherein the grains consist of a mixture of 5%–15% SEB grains and the rest SBS grains.

15. The product of claim 1 wherein the body has a density between 0.55 and 0.65 g/ml.

16. The product of claim 1 wherein the polymer body further comprises a multitude of mesh fragments scattered throughout the polymer grains.

17. The product of claim 16 wherein the mesh fragments are chopped sheets of polypropylene mesh material formed into squares between one-eighth and one-half inch across.

18. The product of claim 17 wherein the mesh fragments are chopped sheets of polypropylene mesh with holes approximately 1/16th of an inch across.

19. The product of claim 16 wherein the body consists of the mesh fragments and a multitude of approximately 6-mesh grains of a mixture of 5%–15% SEB grains and the rest SBS grains agglomerated together to a density between 0.55 and 0.65 g/ml.

20. The product of claim 16 wherein (a) all of the surfaces of the body are roughened, (b) the body has an octagonal outer edge and square cross-sections, (c) the body has an approximately two-inch outer diameter and an approximately two-inch interior diameter, and (d) wherein the mesh fragments are squares between one-eighth and one-half inch across of polypropylene mesh with holes approximately 1/16th of an inch across.

21. A device for ameliorating water-borne oil spills comprising:

(a) a sack comprised of a mesh material that is porous to both water and oil forming a compartment; and (b) a multitude of bodies, each comprised of a multitude of grains of at least one hydrophobic, oil-encapsulating polymer material, which grains are bound together and surround an axial hole of each polymer body, wherein the multitude of polymer bodies are contained within the compartment of the sack.

22. The device of claim 21 wherein each polymer body further comprises a multitude of polypropylene mesh fragments scattered throughout the body.

23. The device of claim 22 wherein the sack is formed of two round sheets of woven polypropylene mesh, and further comprising (a) a plurality of flexible belt members formed of a seat-belt material coupled to the sack and generally positioned along a plurality of diameters of the sheets, (b) a port coupled to a plurality of the flexible belt members, and (c) a flexible ring affixed around the perimeter of the sheets.

24. The device of claim 23 further comprising a multitude of additional bodies, not having axial holes, that are also comprised of an a hydrophobic, oil-encapsulating polymer and also contained within the compartment of the sack.

25. The device of claim 22 further comprising a multitude of additional bodies, not having axial holes, that are also comprised of an a hydrophobic, oil-encapsulating polymer and are also contained within the compartment of the sack.

26. The device of claim 22 wherein the sack is formed of two rectangular sheets, and further comprising attachment devices on each edge at the perimeter of the sack.

27. The device of claim 26 further comprising a multitude of additional bodies, not having axial holes, that are also comprised of an a hydrophobic, oil-encapsulating polymer and are also contained within the compartment of the sack.

28. The device of claim 22 wherein the mesh fragments are chopped sheets of polypropylene mesh formed into squares between one-eighth and one-half inch across and with holes approximately 1/16th of an inch across.

29. The device of claim 22 wherein (a) all of the surfaces of the bodies are roughened, (b) the bodies have an octagonal outer edge and square cross-sections, (c) the bodies have an approximately two-inch outer diameter and an approximately one-inch interior diameter, and (d) wherein the mesh fragments are formed into squares between one-eighth and one-half inch across with holes approximately 1/16th of an inch across.

30. The device of claim 29 wherein the bodies substantially consist of the mesh fragments and a multitude of approximately 6-mesh grains of a mixture of 5%–15% SEB grains and the rest SBS grains agglomerated together to a density between 0.55 and 0.65 g/ml.

31. The device of claim 22 wherein the bodies are at least a half inch across their outer diameter and measure at least a quarter of an inch across the material between their interior and outer diameter, with an interior diameter at least a quarter of an inch across, wherein the hydrophobic, oil-encapsulating polymer is a mixture of SEB and SBS grains and the mesh fragments agglomerated together.

32. The device of claim 31 wherein the bodies are a mixture of 5%–15% SEB grains and the rest SBS grains, wherein the bodies have a density between 0.55 and 0.65 g/ml., and wherein the mesh fragments are formed into squares between approximately one-eighth and one-half inch across with holes approximately 1/16th of an inch across.

33. The device of claim 22 wherein the bodies have polygonal outer edges and square cross-sections, and wherein at least some of the surfaces of the bodies are roughened.

34. The device of claim 21 further comprising an eye coupled to the sack.

35. The device of claim 21 further comprising a port coupled to the sack.

36. The device of claim 21 further comprising a plurality of flexible belt members coupled to the sack and generally positioned along a plurality of diameters of the sack.

37. The device of claim 36 further comprising a port coupled to a plurality of the flexible belt members, which port further supports an eye, and wherein the flexible belt members are formed of a seat-belt material.

38. The device of claim 21 further comprising a flexible ring affixed around the perimeter of the sack.

39. The device of claim 38 wherein the ring is folded over and affixed to the outside of both sheets, thereby forming the ring into a double layer.

40. The device of claim 21 further comprising a multitude of additional bodies, not having axial holes, that are also comprised of a hydrophobic, oil-encapsulating polymer and also contained within the compartment of the sack.

41. The device of claim 40 wherein the additional bodies are formed from material removed in forming the axial holes of the polymer bodies and are generally cylindrical.

42. The device of claim 21 wherein the sack is comprised of two round sheets.

43. The device of claim 21 wherein the sack is comprised of two rectangular sheets, and further comprising attachment devices on each edge at the perimeter of the sack.

44. The device of claim 21 wherein the sack is comprised of two sheets formed of a woven polypropylene mesh.

45. The device of claim 21 further comprising a plurality of buoyant elements coupled to the material of the sack.

46. The device of claim 21:

(a) wherein the sack is formed of two sheets and further comprising an eye coupled to the center of a first one of the sheets;

(b) further comprising a plurality of flexible belt members, each extending from adjacent to the eye to an edge of the first sheet, continuing around the second sheet, and returning to the starting position from the opposite edge of the first sheet;

(c) wherein the two sheets are formed of a woven polypropylene mesh surrounding a multitude of diamond-shaped holes; and (d) wherein the belt members are attached to the sheets and oriented in the same direction as the major axes of the diamond-shaped holes formed by the mesh of the sheets.

47. The device of claim 46 further comprising a central port coupled to the sack, wherein the belt members are formed of a seat-belt material, and wherein the sheets are round.

48. The device of claim 21 wherein the bodies have polygonal outer edges and square cross-sections, and wherein at least some of the surfaces of the bodies are roughened.

49. The device of claim 48 wherein the bodies are at least a half inch across their outer diameter and measure at least a quarter of an inch across the material between their interior and outer diameter, with an interior diameter at least a quarter of an inch across, wherein the hydrophobic, oil-encapsulating polymer material is a mixture of SEB and SBS grains agglomerated together.

50. The device of claim 49 wherein the grains are a mixture of 5%–15% SEB and the rest SBS, and wherein the bodies have a density between 0.55 and 0.65 g/ml.

51. The device of claim 21 wherein the bodies substantially consist of the polymer grains.

* * * * *

UNITED STATES PATENT AND TRADEMARK OFFICE
CERTIFICATE OF CORRECTION

PATENT NO : 6,143,172
DATED : November 7, 2000
INVENTOR(S): Glenn R. Rink et al.

It is certified that error appears in the above-identified patent and that said Letters Patent are hereby corrected as shown below:

In the title of the patent, change "Methods" to -- Apparatus --

In Claim 4 of the patent, change "gains" to -- grains --

Signed and Sealed this

First Day of May, 2001

Attest:

NICHOLAS P. GODICI

Attesting Officer    Acting Director of the United States Patent and Trademark Office